(12) United States Patent
Nakamura et al.

(10) Patent No.: US 8,581,576 B2
(45) Date of Patent: Nov. 12, 2013

(54) ROTATION ANGLE DETECTION DEVICE

(75) Inventors: Ryousuke Nakamura, Shizuoka (JP);
Shigeyoshi Inagaki, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 13/432,902

(22) Filed: Mar. 28, 2012

(65) Prior Publication Data

US 2012/0255164 A1    Oct. 11, 2012

(30) Foreign Application Priority Data

Apr. 11, 2011    (JP) .................................. 2011-087355

(51) Int. Cl.
*G01B 7/30*    (2006.01)

(52) U.S. Cl.
USPC .................. 324/207.25; 324/207.2; 29/592.1; 29/739

(58) Field of Classification Search
USPC .................. 29/740–743, 705, 719–721, 739; 310/68 B, 156.06, 216; 324/207.2–207.25; 338/32 R, 32 H
See application file for complete search history.

(56) References Cited

U.S. PATENT DOCUMENTS

| | | | |
|---|---|---|---|
| 5,960,534 A | 10/1999 | Yazawa et al. | |
| 6,194,710 B1 | 2/2001 | Mitterreiter | |
| 6,867,584 B1 * | 3/2005 | Kurita et al. | 324/207.25 |
| 7,002,339 B2 * | 2/2006 | Kawashima et al. | 324/207.25 |
| 7,378,838 B2 * | 5/2008 | Mizutani et al. | 324/207.2 |
| 8,283,917 B2 * | 10/2012 | Sano | 324/207.25 |
| 2004/0031914 A1 | 2/2004 | Igaki et al. | |
| 2010/0114524 A1 * | 5/2010 | Saito et al. | 702/151 |
| 2012/0062218 A1 * | 3/2012 | Hiramoto et al. | 324/207.25 |
| 2012/0255164 A1 * | 10/2012 | Nakamura et al. | 29/739 |

FOREIGN PATENT DOCUMENTS

| | | |
|---|---|---|
| DE | 198 16 827 A1 | 10/1999 |
| JP | H08-23194 A | 1/1996 |
| JP | 2007-155482 A | 6/2007 |
| JP | 2010-60478 A | 3/2010 |

OTHER PUBLICATIONS

The Extended European Search Report dated Aug. 21, 2012; EP Application No. 12002532.5-2213.
The Korean Office Action dated May 23, 2013, which corresponds to Korean Patent Application No. 10-2012-0033634 and is related to U.S. Appl. No. 13/432,902 with English summary.

* cited by examiner

*Primary Examiner* — Minh Trinh
(74) *Attorney, Agent, or Firm* — Studebaker & Brackett PC

(57) ABSTRACT

A rotation angle detection device of the present invention includes: a support body; a rotating body that can rotate with respect to the support body about a rotation axis and move in a rotation axis direction; a rotation angle detection unit that has a magnet attached to either of the support body and the rotating body, and a magnetic sensor attached to the other of the support body and the rotating body and facing the magnet in the rotation axis direction, and that detects a rotation angle of the rotating body on the basis of an output signal of the magnetic sensor; and a position detection unit that detects that the rotating body is positioned at a detection position in which a distance between the magnet and the magnetic sensor in the rotation axis direction becomes a predetermined detection distance. The rotation angle detection unit reads the output signal of the magnetic sensor and determines the rotation angle of the rotating body with respect to the support body from the output signal when the position detection unit detects that the rotating body is positioned at the detection position.

6 Claims, 16 Drawing Sheets

PERSPECTIVE VIEW

PARTIALLY ENLARGED PERSPECTIVE VIEW

PARTIAL CROSS-SECTIONAL VIEW TAKEN ALONG A-A LINE

PARTIAL CROSS-SECTIONAL VIEW TAKEN ALONG B-B LINE

__US 8,581,576 B2__

ROTATION ANGLE DETECTION DEVICE

BACKGROUND OF THE INVENTION

1. Field of the Invention

The present invention relates to a rotation angle detection technique for detecting the rotation angle of a rotating body by using a magnetic sensor and to a part mounting apparatus using this technique.

2. Background Art

A variety of mechanisms have been suggested for detecting the rotation angle of a rotating body that rotates about a rotation axis. For example, Japanese Patent Application Publication No. 2007-155482 describes a rotation angle detection device in which the rotation angle of a follower that rotates following the rotation of a steering wheel is detected by using a MI (Magneto-Impedance) sensor. In such a rotation angle detection device, a magnet is attached to one end of the follower, and the MI sensor is disposed to face the magnet from the rotation axis direction. The MI sensor outputs a signal of a value corresponding to the rotation angle of the magnet that rotates integrally with the follower. Therefore, the rotation angle of the follower can be reverse calculated from the output signal of the MI sensor.

However, the output signal of the magnetic sensor such as a MI sensor changes depending not only on the rotation angle of the magnet but also on the distance between the magnetic sensor and the magnet. Thus, where the distance between the magnetic sensor and the magnet changes, the magnetic sensor outputs signals of different value even if the rotation angle of the magnet is the same. Therefore, in configurations in which the rotating body not only rotates about a rotation axis, but also moves in the rotation axis direction, the rotation angle of the magnet cannot be accurately determined from the output signal of the magnetic sensor. As a result, the detection accuracy of the rotation angle of a rotating body is sometimes decreased.

SUMMARY OF THE INVENTION

It is an object of the present invention to provide a technique that makes it possible to detect the rotation angle of a rotating body with high accuracy with a magnetic sensor even in a configuration in which the rotating body not only rotates about the rotation axis, but also moves in the rotation axis direction.

A rotation angle detection device according to one aspect of the present invention includes: a support body; a rotating body that has a rotation axis and can rotate with respect to the support body and move in a rotation axis direction that is an extension direction of the rotation axis; a rotation angle detection unit that has a magnet attached to either of the support body and the rotating body, and a magnetic sensor attached to the other of the support body and the rotating body and facing the magnet in the rotation axis direction, and that detects a rotation angle of the rotating body with respect to the support body on the basis of an output signal of the magnetic sensor; and a position detection unit that detects that the rotating body is positioned at a detection position in which a distance between the magnet and the magnetic sensor in the rotation axis direction becomes a predetermined detection distance, wherein the rotation angle detection unit reads the output signal of the magnetic sensor and determines the rotation angle of the rotating body with respect to the support body from the output signal when the position detection unit detects that the rotating body is positioned at the detection position.

DETAILED DESCRIPTION OF THE PREFERRED EMBODIMENTS

An embodiment of the present invention will be described below with reference to drawings.

Figure 1:
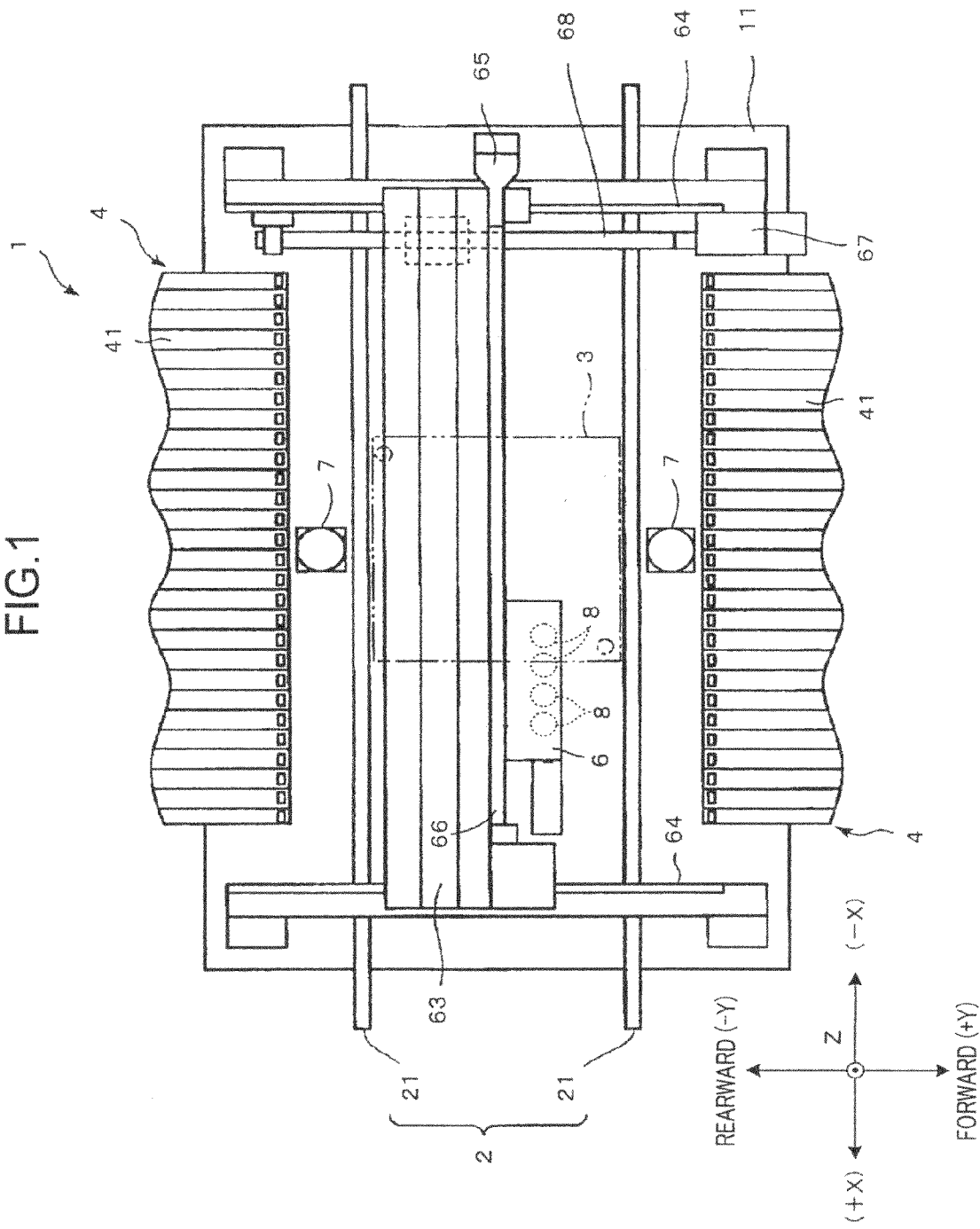
FIG. 1 is a plan view illustrating a schematic configuration of an embodiment of the part mounting apparatus in accordance with the present invention.

FIG. 1 is a plan view illustrating the schematic configuration of an embodiment of the part mounting apparatus in accordance with the present invention. In FIG. 1 and the figures explained hereinbelow, a XYZ orthogonal coordinate system is shown to clarify the directional relationships in the figures.

A part mounting apparatus 1 is provided with a substrate conveying mechanism 2 that is disposed on the base 11 and can convey a substrate 3 in a predetermined conveying direction X. More specifically, the substrate conveying mechanism 2 has a pair of conveyors 21 for conveying the substrate 3 from right to left, as shown in FIG. 1, on the base 11. The conveyors 21 carry the substrate 3, stop the substrate at a predetermined mounting position (position of the substrate 3 shown in the figure), and fix and hold the substrate 3 with a holding device (not shown in the figure). Electronic parts supplied from a part supply unit 4 are moved to the substrate 3 by a mounting head 8 installed on the head unit 6. Where the mounting operation of all of the parts that should be mounted on the substrate 3 is completed, the substrate conveying mechanism 2 carries out the substrate 3. A part recognition camera 7 is disposed above the base 11. The part recognition camera 7 is constituted by an irradiation unit and a CCD (Charge Coupled Device) camera and picks up the image of the electronic part held at each mounting head 8 of the head unit 6 from below.

The aforementioned part supply units 4 are disposed at the front side (+Y axis direction side) and rear side (−Y axis direction side) of the substrate conveying mechanism 2 of the above-described configuration. These part supply units 4 are provided with a large number of tape feeders 41. Each tape feeder 41 has disposed therein a reel (not shown in the figure) having wound thereon a tape that accommodates and holds the electronic parts. Such a tape feeder can supply the electronic parts to the head unit 6. Thus, small chip-like electronic parts such as integrated circuits (IC), transistors, and capacitors are accommodated and held with a predetermined spacing on each tape. Where the tape feeder 41 feeds the tape from the reel to the head unit 6 side, the electronic parts located on the tape are intermittently fed out. As a result, the electronic parts can be attracted by the mounting head 8 of the head unit 6.

Figure 2:
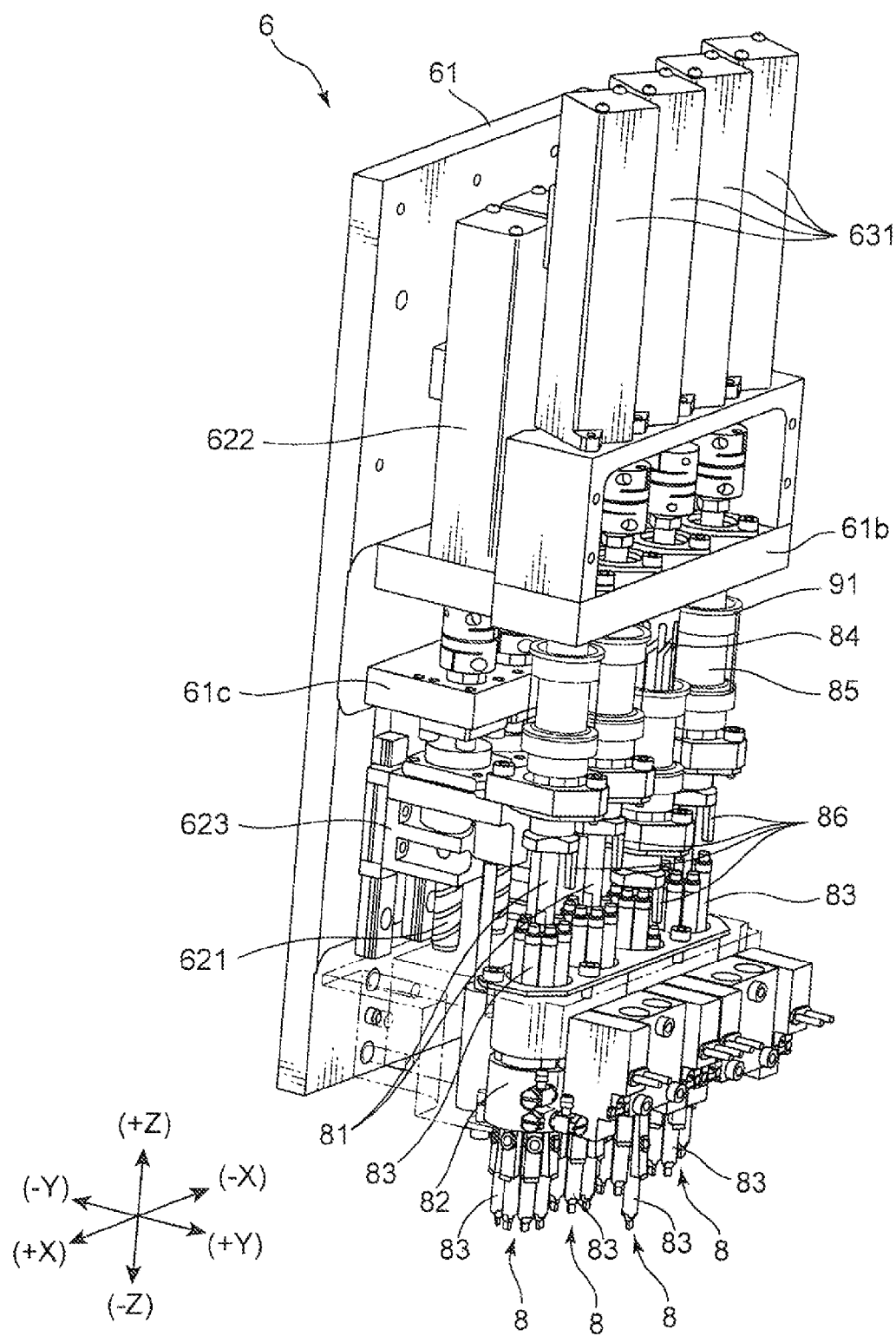
FIG. 2 is a partial perspective view of a head unit.
Figure 3:
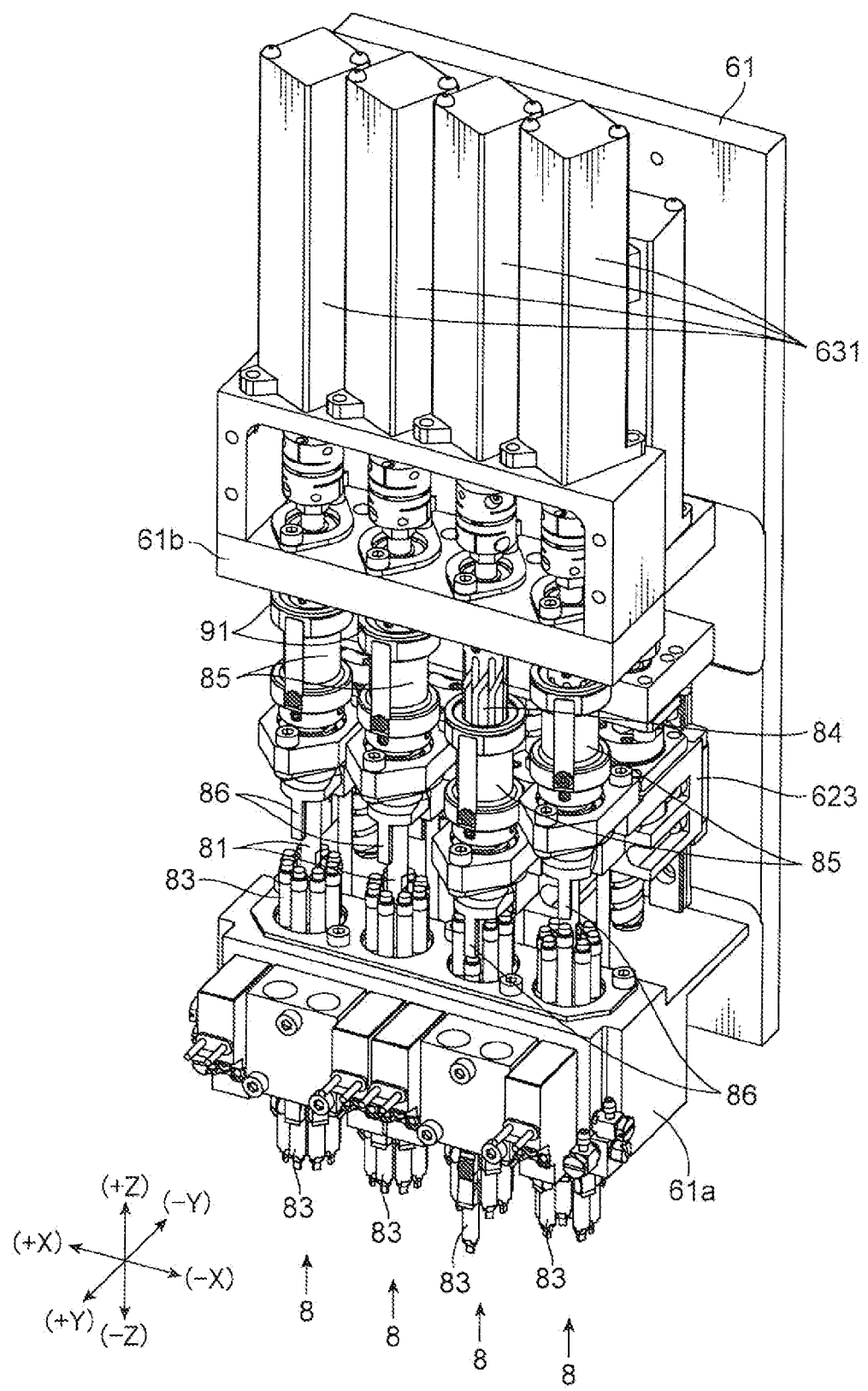
FIG. 3 is a partial isometric view of the head unit.
Figure 4:
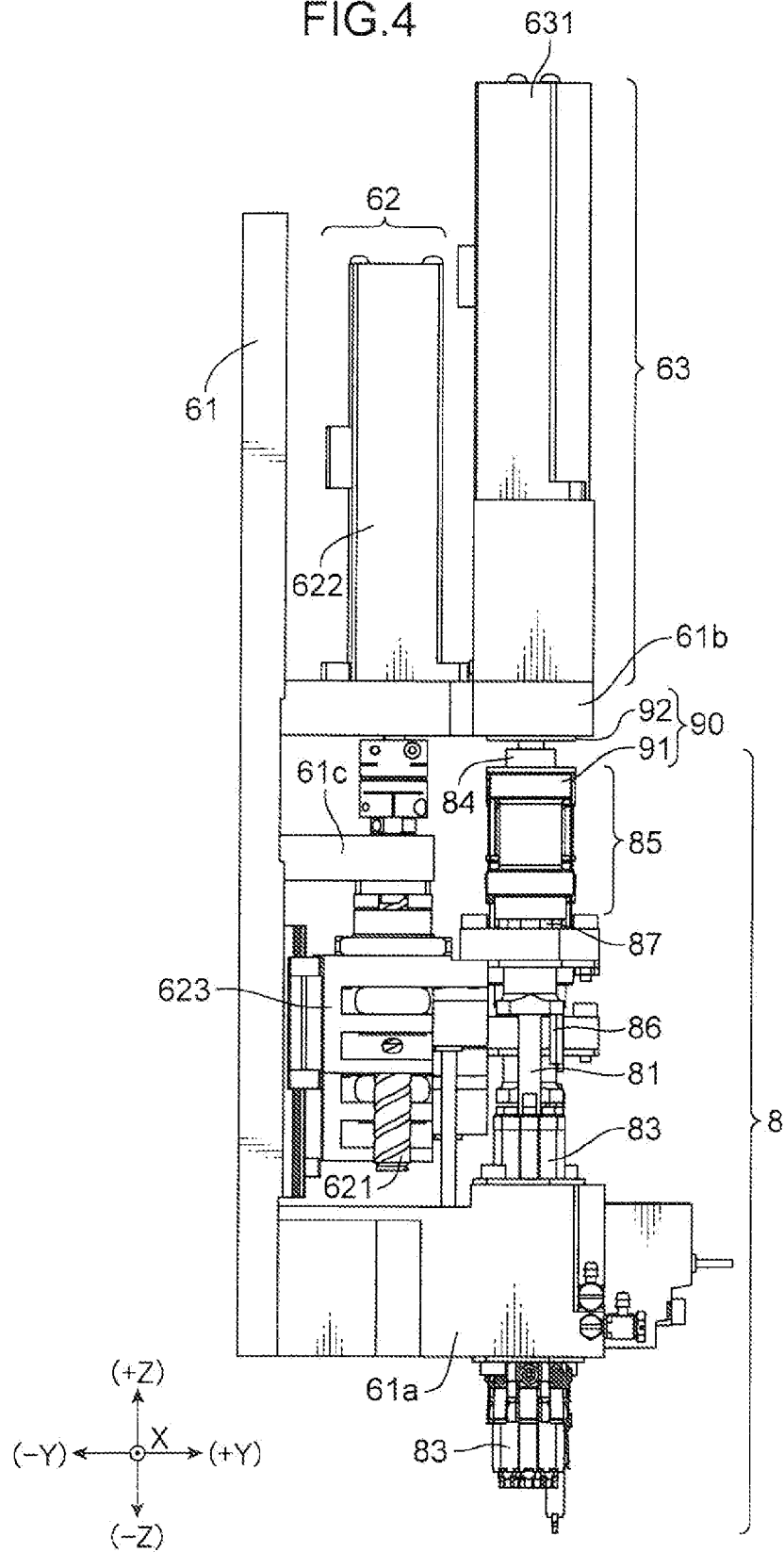
FIG. 4 is a partial side view of the head unit.
Figure 5:
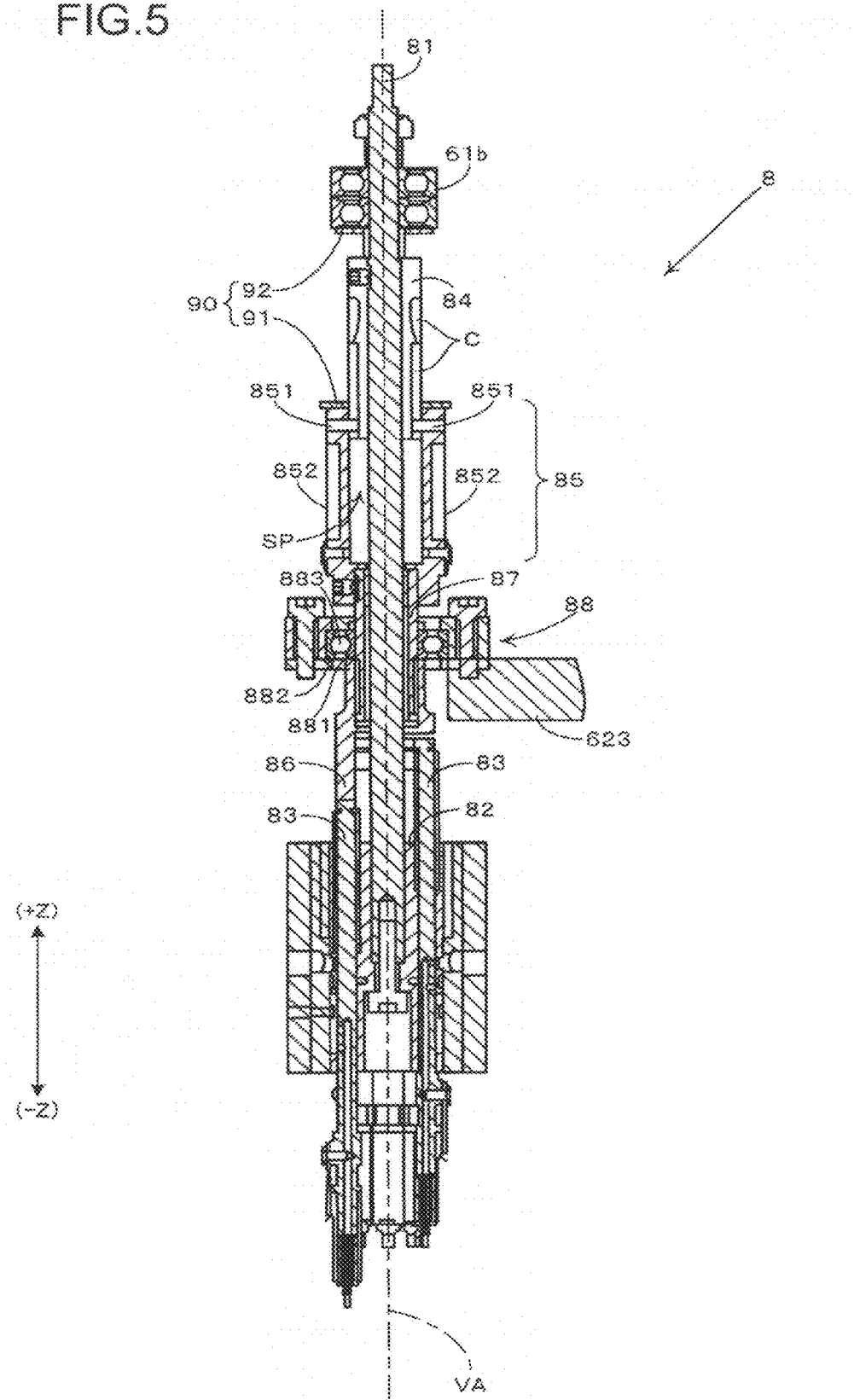
FIG. 5 is a partial cross-sectional view of a mounting head.

The head unit 6 conveys the electronic parts attracted at the part supply unit by the mounting head 8 to the substrate 3, while the electronic parts are being held, and moves the electronic parts to the position indicated by the user. The head unit 6 and the mounting head 8 provided with the head unit 6 will be described below in greater detail with reference to FIG. 2 to FIG. 5. FIG. 2 is a partial perspective view of the head unit. FIG. 3 is a partial isometric view of the head unit. FIG. 4 is a partial side view of the head unit. FIG. 5 is a partial cross-sectional view of a mounting head.

In a schematic configuration of the head unit 6, four mounting heads 8 are arranged in a row in the X direction (horizontal direction) and these mounting heads are supported by a support frame 61 from behind (−Y axis direction). More specifically, these mounting heads 8 are supported by two arms 61a, 61b (the arm 61b corresponds to the support arm in accordance with the present invention) extending forward (+Y direction) from the support frame 61. Since the four mounting heads 8 have a substantially common configuration, the explanation of the mounting head 8 will be conducted hereinbelow essentially with respect to one representative mounting head 8, corresponding reference numerals will be assigned to other mounting heads 8, and the explanation thereof will be omitted as appropriate.

The mounting head 8 is provided with a long shaft 81 extending in the up-down axial (Z axis) direction. A nozzle holder 82 is disposed at the lower portion of the shaft 81 in the up-down axial direction (Z direction). The nozzle holder 82 is provided with a total of eight attraction nozzles 83 arranged circularly with a predetermined spacing around the vertical axis (Z axis) and supported so that the attraction nozzle can move up and down in the vertical axis direction (Z direction).

A mechanism for selectively pushing down one of these attraction nozzles 83 and supplying the selected attraction nozzle to the part attraction operation is provided above, in the vertical axis direction (Z direction), of these eight attraction nozzles 83. More specifically, the pushing mechanism is realized by a guide member 84, a moving member 85 (corresponds to the rotating body in accordance with the present invention) that can move with respect to the guide member 84, a nozzle pushing member 86 that moves integrally with the moving member 85, and a link member 87 that joins the nozzle pushing member 86 to the moving member 85.

Thus, the guide member 84 is disposed at the upper portion, in the vertical axis direction (Z direction), of the shaft 81 and has a cylindrical shape, with the central axis thereof being parallel to the vertical axis direction (Z direction). The guide member 84 is attached so that the central axis thereof coincides with the central axis of the shaft 81. A groove C is formed in the circumferential surface of the guide member.

The moving member 85 is provided below (FIG. 5), in the vertical axis direction (Z direction), of the guide member 84 and can move in the vertical axis direction (Z direction) with respect to the guide member 84. The moving member 85 has a cylindrical shape with the central axis thereof being parallel to the vertical axis direction (Z direction). A cylindrical columnar hole passing through in the vertical axis direction (Z direction) is formed as a hollow portion SP in the moving member. The diameter of the hollow portion SP of the moving member 85 is somewhat larger than the diameter of the guide member 84, and when the guide member 84 is fitted into the hollow portion SP, the moving member 85 can move in the vertical axis direction (Z direction) with respect to the guide member 84.

Two pin-shaped movable elements 851 protruding inward from the inner wall (of the hollow portion SP) of the moving member 85 are provided at positions shifted by 180° with respect to each other with respect to the central axis of the moving member 85 as a center. More specifically, a small-diameter hole passing through from the outer wall to the inner wall of the moving member 85 is formed correspondingly to each moving element 851, and the movable elements 851 are movably fitted into the corresponding small-diameter holes. Further, one of the two ends of each moving element 851 that is on the outer wall side of the moving member 85 abuts on a plate spring 852 that impels the moving element 851. In other words, the lower end portion of the plate spring 852 is fixed to the outer wall of the moving member 85, whereas the upper end of the plate spring 852 is a free end, and the moving element 851 abuts on this free end. The moving element 851 is thus impelled inward (guide member 84 side) by the plate spring 852.

The moving element 851 of the moving member 85 is pushed by the impelling force of the plate spring 852 into the groove C, while being fitted in the groove C of the guide member 84. In this state, the moving member 85 moves in the vertical axis direction (Z direction) with respect to the guide member 84. In this case, the movement of the moving member 85 is guided by the guide member 84 so that the moving element 851 moves along the groove C. As a result, in addition to the linear descending movement of the moving member 85 in the vertical axis direction (Z direction), when the moving member moves reciprocatingly in the vertical axis direction (Z direction), the moving member is guided by the guide member 84 to rotate about the vertical axis (Z axis). The configuration that realizes such guided movement will be explained below in greater detail with reference to FIG. 6 and FIG. 7.

A nozzle pushing member 86 is fixed by the link member 87 to the lower end of the moving member 85 in the vertical axis direction (Z direction) thereof. The nozzle pushing member 86 is a rod-like member that extends in the vertical axis direction (Z direction) and moves integrally with the moving member 85. Therefore, in addition to the linear descending movement performed integrally with the moving member 85 in the vertical axis direction (Z direction), the nozzle pushing member can also rotate about the vertical axis (Z axis) integrally with the moving member 85. Further, one of the eight attraction nozzles 83 is selectively pushed down in the vertical axis direction (Z direction) and supplied to the part attraction operation by the nozzle pushing member 86.

In other words, when the eight attraction nozzles 83 are not supplied to the part attraction operation, the attraction nozzles are pulled up (+Z direction) in the vertical axis direction by the impelling force of an impelling member (not shown in the figure), but when the attraction nozzles are supplied to the attraction operation, the attraction nozzles are pushed down (−Z direction) in the vertical axis direction against the impelling force by the nozzle pushing member 86. In this case, by rotating about the vertical axis (Z axis), the nozzle pushing member 86 selectively moves to eight above-nozzle positions (in this particular case, a position directly above the attraction nozzles 83 in the vertical axis direction (Z direction)) arranged around the vertical axis (Z axis) correspondingly to each of the eight attraction nozzles 83 above the eight attraction nozzles 83. The nozzle pushing member 86 moves down from the above-nozzle position corresponding to the selected attraction nozzle 83 and the attraction nozzle 83 is pushed down. The attraction nozzle 83 that has thus been pushed down attracts the part at the distal end portion of the nozzle. Thus, in the configuration shown in FIG. 2 and FIG. 3, one of the eight attraction nozzles 83 provided in the third (from the left side in the figures) mounting head 8 is pushed down.

These eight attraction nozzles 83 are configured to be capable of rotating about the vertical axis VA (Z direction). The merits of such a configuration will be illustrated by several examples below. Thus, when the (opening of the) distal end portion of the attraction nozzle 83 has a rectangular shape, a part is advantageously attracted by the attraction nozzle 83 in a state in which the longitudinal direction of the distal end portion of the attraction nozzle 83 coincides with the longitudinal direction of the part. This is because the sufficient attraction force of the attraction nozzle 83 can be demonstrated and the part can be strongly attracted and held. Therefore, where the eight attraction nozzles 83 are configured to be rotatable, the attraction nozzles 83 can be rotated as appropriate prior to the part attraction operation and the longitudinal directions of the distal end portion of the attraction nozzle 83 and the part can be matched. Alternatively, when the attracted part is mounted on the substrate 3, the rotation angle of the attracted part should be matched with the pattern on the surface of the substrate 3, and where the eight attraction nozzles 83 are configured to be rotatable, such angular adjustment of the attracted part can be easily performed. Further, where these attraction nozzles 83 are rotated as appropriate, while moving a plurality of attraction nozzles 83 within the X-Y plane, the attraction nozzles 83 can be positioned above, in the vertical axis direction (Z direction), of the part that is the attraction object in a simple manner and with high accuracy.

Further, the aforementioned configuration is such that a plurality of attraction nozzles 83 and the nozzle pushing member 86 are linked by the shaft 81 to be capable of rotating integrally so that the rotation of the attraction nozzle 83 would not change the mutual arrangement of the attraction nozzle 83 and the nozzle pushing member 86. More specifically, the upper portion of the shaft 81 is supported by the arm 61*b*, with a bearing being interposed therebetween, and the shaft 81 is supported to be capable of rotating about the vertical axis VA (Z axis) with respect to the arm 61*b*. In this case, the shaft 81 is configured to rotate together with the moving member 85, link member 87, nozzle pushing member 86, and a plurality of attraction nozzles 83. Therefore, when the shaft 81 rotates, the attraction nozzles 83 rotate and the nozzle pushing member 86 also rotates following the rotation of the attraction nozzles 83.

The schematic configuration of the mounting head 8 is described above. Two drive means (a Z axis drive means 62 and a R axis drive means 63) that drive the mounting head 8 will be described below. As mentioned hereinabove, in the mounting head 8, the operation of pushing down and the operation of switching the attraction nozzles 83 are implemented by moving the moving member 85 in the vertical axis direction (Z direction) integrally with the nozzle pushing member 86. In this case, the Z axis drive means 62 is provided as a means for driving the moving member 85 in the vertical axis direction (Z direction). The Z axis drive means 62 is provided between the support frame 61 and the mounting head 8 and supported by two arms 61*b*, 61*c* extending forward (+Y direction) from the support arm 61.

More specifically, the Z axis drive means 62 is provided with a ball screw shaft 621 extending in the vertical axis direction (Z direction), a Z axis motor 622 that is disposed above the ball screw shaft 621 in the vertical axis direction (Z direction) and rotationally drives the ball screw shaft 621, and a movable member 623 engaged with the ball screw shaft 621. Where the Z axis motor 622 rotates the ball screw shaft 621 forward or in reverse about the vertical axis (Z axis), the movable member 623 moves up or down in the vertical axis direction (Z direction). The movable member 623 supports the link member 87 joining the moving member 85 to the nozzle pushing member 86 by a ball bearing 88. More specifically, the ball bearing 88 having a configuration in which balls 883 are interposed between an inner ring 881 and an outer ring 882 is disposed between the movable member 623 and the link member 87, the inner ring 881 of the ball bearing 88 is fixed to the link member 87, and the outer ring 882 of the ball bearing 88 is fixed to the movable member 623. Thus, the movable member 623 supports the moving member 85, nozzle pushing member 86, and link member 87 so that these three members can rotate about the vertical axis VA (Z axis). As the movable member 623 moves up and down in the vertical axis direction (Z direction), the moving member 85, nozzle pushing member 86, ball bearing 88, and link member 87 move up and down in the vertical axis direction (Z direction). The moving member 85 and nozzle pushing member 86 can thus be integrally moved in the vertical axis direction (Z direction) by the Z axis drive means 62.

As mentioned hereinabove, the mounting head 8 is configured such that the shaft 81 is rotated about the vertical axis (Z axis) with the moving member 85, link member 87, nozzle pushing member 86, and a plurality of attraction nozzles 83. The R axis drive means 63 is provided for rotationally driving the shaft 81 about the vertical axis (Z axis). More specifically, the R axis drive means 63 is provided with an R axis motor 631 attached to the upper end of the shaft 81. The shaft 81 can be rotated forward and in reverse about the vertical axis (Z axis) by the rotational drive force of the R axis motor 631.

In the head unit 6, four mounting heads 8 are arranged in a row in the horizontal direction (X direction), and the Z axis drive means 62 and the R axis drive means 63 are disposed correspondingly to these mounting heads 8. In this case, four Z axis drive means 62 are arranged in a row in the horizontal direction (X direction) and four R axis drive means 63 are arranged in a row in the horizontal direction (X direction). Further, the row of the four Z axis drive means 62 and the row of the four R axis drive means 63 are disposed parallel to each other, as viewed from the vertical axis direction (Z direction). With such a configuration, the constituent members (mounting heads 8, Z axis drive means 62, and R axis drive means 63) of the surface mounting apparatus 1 can be disposed in a compact manner and the surface mounting apparatus 1 can be reduced in size. In particular, a layout is used in which the row of the four Z axis drive means 62 and the row of the four R axis drive means 63 are disposed parallel to each other. Therefore, the distance between the mounting heads 8 adjacent in the horizontal direction (X direction), and therefore the distance between the nozzle groups (groups constituted by eight attraction nozzles 83) provided in the mounting heads 8, can be reduced (by comparison with the series arrangement in which the Z axis drive means 62 and R axis drive means 63 are arranged in a single row adjacently to each other).

Figure 6:
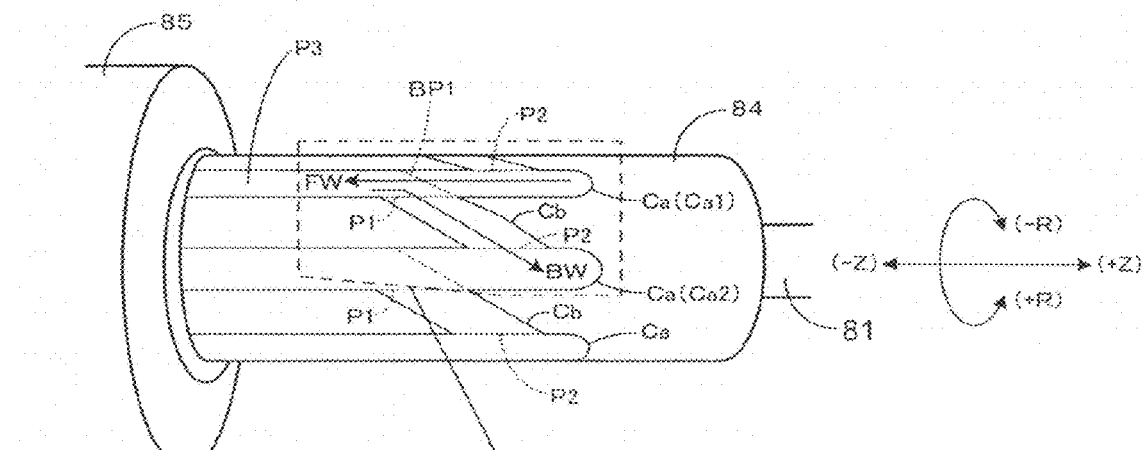
FIG. 6 is a perspective view (top) illustrating a guide member and a moving member and a partial enlarged perspective view (bottom) showing on an enlarged scale a portion surrounded by a broken line in the top view.
Figure 6:
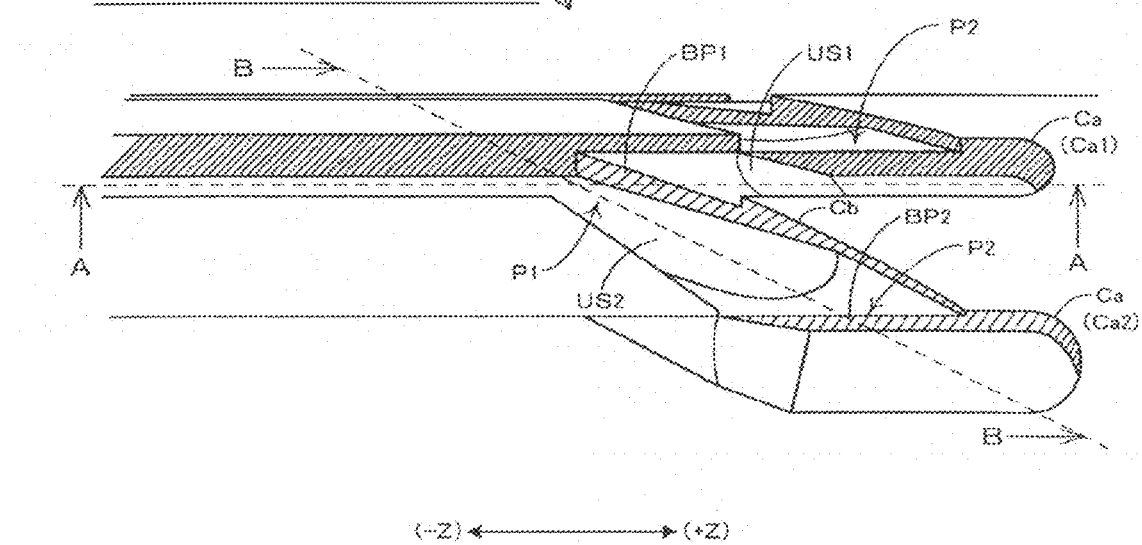
Figure 7:
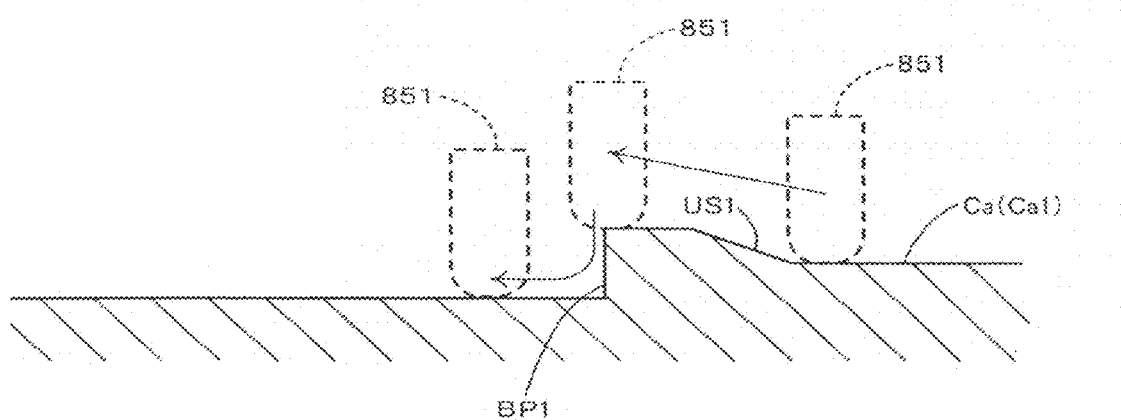
FIG. 7 is a partial cross-sectional view (top) taken along the A-A line in FIG. 6 and a partial cross-sectional view (bottom) taken along the B-B line in FIG. 6.
Figure 7:
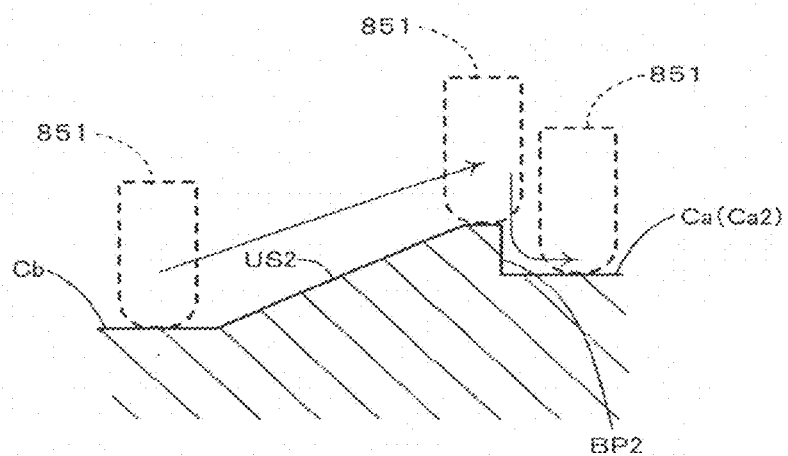

As mentioned hereinabove, the mounting head 8 of the present embodiment is provided with a guide member having formed therein the groove C for guiding the moving member 85. The guide member 84 will be described below in greater detail. FIG. 6 is a perspective view (top) illustrating the guide member and the moving member and a partial enlarged perspective view (bottom) showing on an enlarged scale a portion surrounded by a broken line in the top view. In the state shown in the top view in the figure, a large portion of the guide member 84 protrudes upward in the vertical axis direction (Z direction) with respect to the moving member 85. A rotation coordinate axis R representing rotation about the vertical axis (Z axis) is also shown in the figure. FIG. 7 is a partial cross-sectional view (top) taken along the A-A line in FIG. 6 and a partial cross-sectional view (bottom) taken along the B-B line in FIG. 6.

As shown in FIG. 6, the groove C on the peripheral surface of the guide member 84 in the form of a round rod is constituted by eight guide grooves Ca extending in the vertical axis direction (Z direction) and having a predetermined length in the vertical axis direction (Z direction) and eight connecting grooves Cb that connect the guide groove Ca adjacent in the direction around the vertical axis (Z axis). These eight guide grooves Ca are provided at a one-to-one correspondence relationship with the eight attraction nozzles 83 (in other words, eight above-nozzle positions) of the mounting head 8 and formed with a spacing of 45° (=360°/8) around (in the R axis direction) the vertical axis (Z axis). Branch openings P1, P2 connected to the connecting groove Cb are formed in each guide groove Ca. Among these branch openings, the lower branch opening P1 is formed in a side wall of the guide groove Ca on the reverse rotation side (−R side) thereof, whereas the upper branch opening P2 is formed in a side wall of the guide groove Ca on the forward rotation side (+R side) thereof and higher in the vertical axis direction (Z direction) than the lower branch opening P1. The connecting groove Cb is formed so as to connect linearly the lower branch opening P1 of the guide groove Ca on the reverse rotation side (−R side), from among two guide grooves Ca adjacent in the rotation axis direction (R direction) to the upper branch opening P2 of the guide groove Ca on the forward rotation side (+R). In other words, the two guide grooves Ca adjacent in the rotation axis direction (R direction) are connected by the oblique connecting groove Cb rising in the forward rotation direction (+R direction). The guide grooves Ca and the connecting grooves Cb are formed periodically with a period of 45° in the R axis direction in the peripheral surface of the guide member 84.

The moving element 851 of the moving member 85 is guided by the guide grooves Ca and the connecting grooves Cb, and the abovementioned operations of switching and pushing the attraction nozzles 83 are implemented. These switching and pushing operations are described below where the operation of the moving element 851 is explained. As mentioned hereinabove, the moving member 85 is provided with two moving elements 851; these moving elements 851 perform common operations and the explanation below will relate to one moving member 851.

The operation of rotating the nozzle pushing member 86 for switching the abovementioned attraction nozzles 83 is performed in the following manner. Thus, the moving element 851 protruding from the inner wall of the moving member 85 receives the impelling force of the plate spring 852 and is fitted into the grooves Ca, Cb. In this state, the moving member 85 moves reciprocatingly in the vertical axis direction (Z direction) with respect to the guide member 84, whereby the moving element 851 is guided by the grooves Ca, Cb and moves from one guide groove Ca (Ca1) to another guide groove Ca (Ca2) adjacent thereto. Following this movement, the moving member 85 and the nozzle pushing member 86 rotate to the forward rotation side (+R side). This process will be explained below with reference to the representative movement of the moving element 851 from the guide groove Ca1 to the guide groove Ca2.

First, in the forward route FW, the moving element 851 moves down in the vertical axis direction (Z direction) from the upper end of the guide groove Ca1 to the lower branch opening P1 (or a position below the lower branch opening P1). In this forward path FW, the moving element 851 passes, against the impelling force of the plate spring 852, over the upward slope US1 formed in the guide groove Ca1 so as to rise in the advance direction and then falls, under the effect of the impelling force of the plate spring 852, from the step BP1 formed at a position of entering the lower branch opening P1 (partial cross-sectional views taken along the A-A line in FIG. 6 and FIG. 7).

In the following backward path BW, the moving element 851 rises in the vertical axis direction (Z direction) and moves from the guide groove Ca1 to the guide groove Ca2. In other words, where the moving element 851 rises along the guide groove Ca1 and reaches the lower branch opening P1 in the backward path BW, the moving element collides with the step BP1. Since the moving element 851 that has collided with the step BP1 cannot further rise along the guide Ca1, the moving element shifts into the connecting groove Cb, moves upward in the vertical axis direction (Z direction), while following the connecting groove Cb, and reaches the guide groove Ca2. At this time, the moving element 851 passes, against the impelling force of the plate spring 852, over the upward slope US2 formed in the connecting groove Cb so as to rise in the advance direction and then falls, under the effect of the impelling force of the plate spring 852, from the step BP2 formed at a position of the upper branch opening P2 of the guide groove Ca2 (partial cross-sectional views taken along the B-B line in FIG. 6 and FIG. 7).

As the moving element 851 thus moves from one guide groove Ca1 into the another guide groove Ca2 adjacent thereto, the moving member 85 and the nozzle pushing member 86 fixed thereto rotate. As a result, the nozzle pushing member 86 moves from one above-nozzle position corresponding to one guide groove Ca1 to another above-nozzle position corresponding to the other guide groove Ca2. Therefore, the operation of switching the attraction nozzles 83 can be performed when the Z axis drive means 62 moves the moving member 85 reciprocatingly in the vertical axis direction (Z direction).

By contrast, the operation of pushing the attraction nozzle 83 down is basically implemented by lowering the moving element 851 from any height along the guide groove Ca. Thus, the mounting head 8 is configured such that when the moving element 851 arrives to the pushing start position P3 that is displaced downward in the vertical axis direction (Z direction) from the reciprocating movement range of the moving element 851 in the nozzle switching operation, the nozzle pushing member 86 abuts upon the upper end of the attraction nozzle 83 and starts pushing the attraction nozzle 83 down. The reason for this is as follows.

In other words, the operation of lowering the attraction nozzle 83 to attract a part and then lifting the attraction nozzle that holds the attracted part is appropriately implemented. In this case, the nozzle pushing member 86 and the moving member 85 move upward in the vertical axis direction (Z direction) in order to lift the attraction nozzle 83. Where the moving element 851 reaches the reciprocating movement range in the course of switching the attraction nozzles 83 as a result of such upward movement of the moving member 85, the unintended operation of switching the attraction nozzles 83 can be performed. Accordingly, in the mounting head 8, the pushing start position P3 is set below the aforementioned reciprocating movement range, and the mounting head is configured such that where the moving element 851 is lifted to the pushing start position P3, the lift of the attraction nozzle 83 can be completed. From the state in which the moving element 851 is below the reciprocating movement range at the time the operation of switching the attraction nozzles 83 is implemented and above the nozzle pushing start position P3, the Z axis drive means 62 lowers the moving member 85 and implements the operation of pushing the attraction nozzle 83.

Furthermore, in the present embodiment, the Z axis drive means 62 implements the switching operation, while holding the nozzle pushing member 86 in a zone above (+Z direction) the eight attraction nozzles 83 in the vertical axis direction, but implements the pushing operation by lowering the nozzle pushing member 86 from below (−Z direction) this zone in the vertical axis direction to the attraction nozzle 83. As a result, the operation of switching the attraction nozzles 83 can be performed, while maintaining the nozzle pushing member 86 in the zone above (+Z direction) the eight attraction nozzles 83 in the vertical axis direction, without pushing the attraction nozzle 83 with the nozzle pushing member 86. Therefore, only the operation of switching the attraction nozzles 83 can be adequately implemented, without unnecessarily performing the operation of pushing the attraction nozzle 83. As a consequence, when the operation of switching the attraction nozzles 83 is implemented, the attraction nozzle 83 can be prevented from being lowered unintentionally and interfering with other surrounding members.

Thus, the operation of selectively moving the nozzle pushing member 86 to one of a plurality of above-nozzle positions, lowering the nozzle pushing member 86 from the selected above-nozzle position, and pushing the attraction nozzle 83 is implemented by rotation about the vertical axis (Z axis) that is performed integrally with the moving member 85. In this case, in order to push down accurately the desirable attraction nozzle 83, it is preferable to determine the rotation angle of the nozzle pushing member 86 and push down the attraction nozzle 83, while verifying whether or not the rotation angle corresponds to the desired attraction nozzle 83. Accordingly, in the present embodiment, an angle detection mechanism 90 is provided for detecting the rotation angle of the moving member 85 that rotates integrally with the nozzle pushing member 86.

Figure 8:
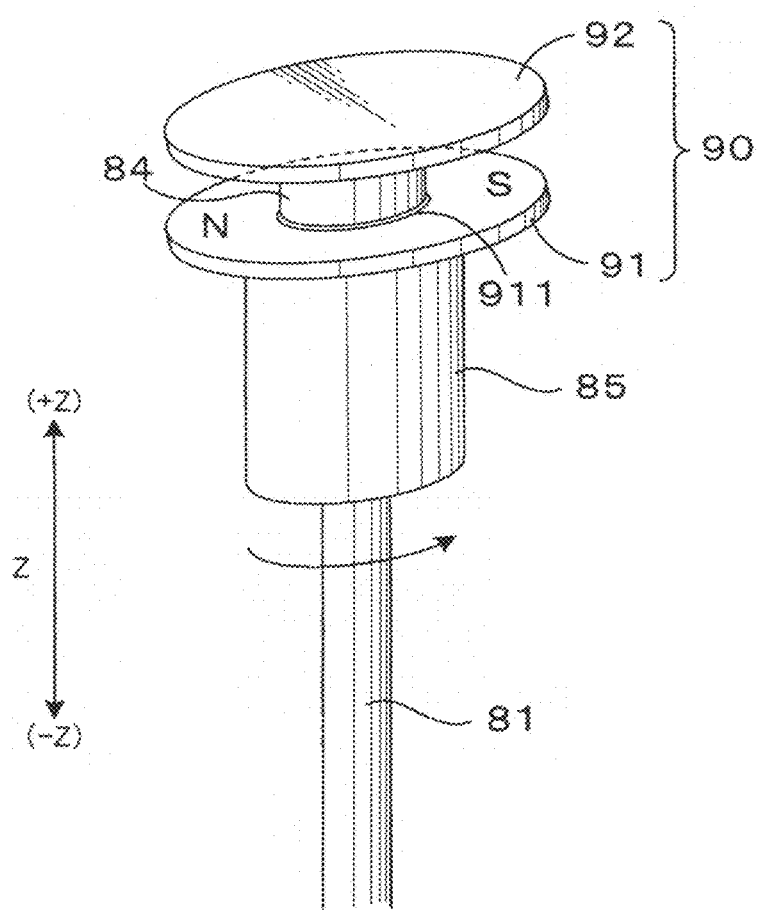
FIG. 8 is a perspective view showing schematically the general configuration of an angle detection mechanism that detects the rotation angle of the moving member.
Figure 9:
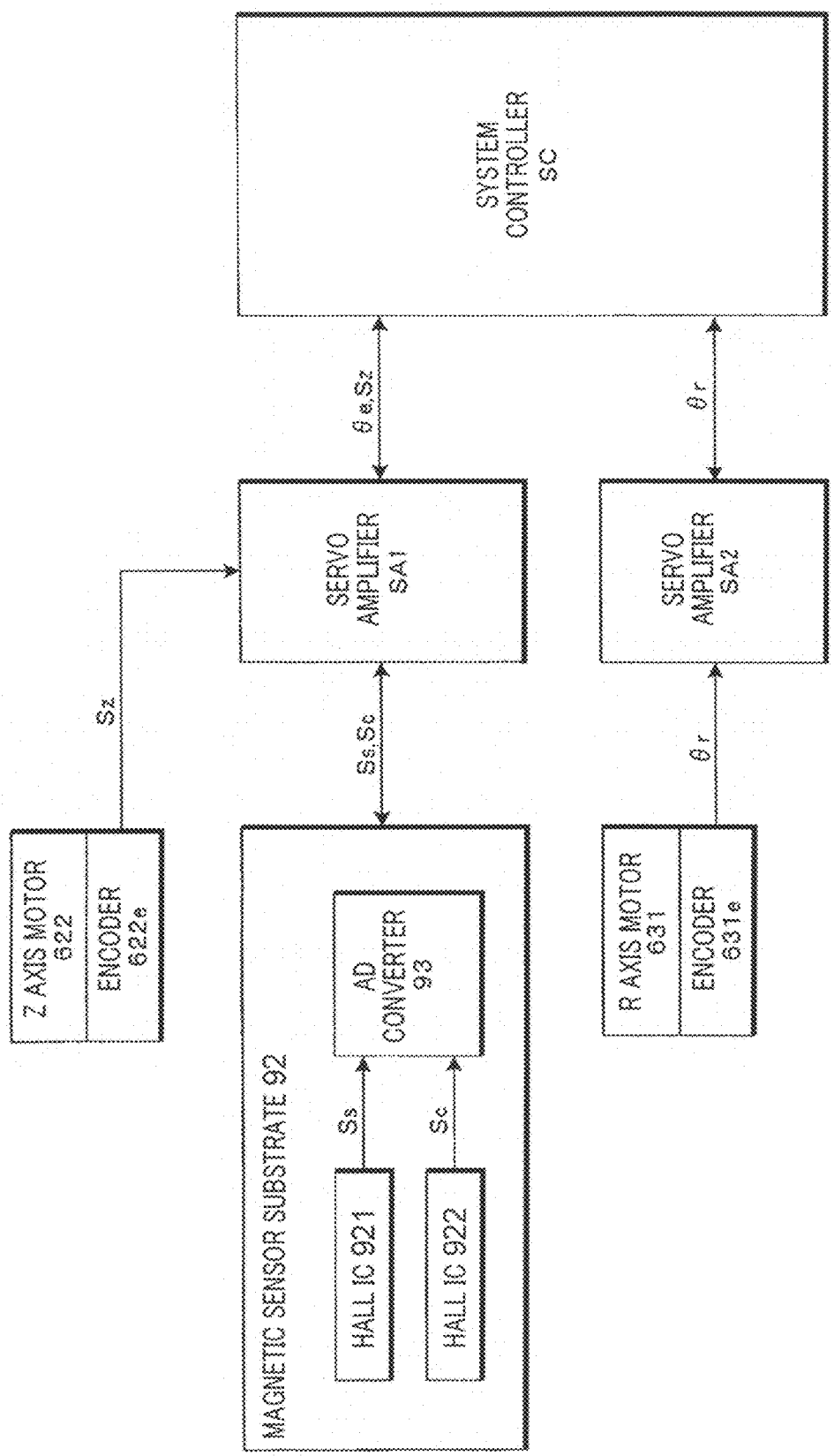
FIG. 9 is a block diagram illustrating the electric configuration that detects the rotation angle of a nozzle pushing member by using the angle detection mechanism shown in FIG. 8.

FIG. 8 is a perspective view showing schematically the general configuration of an angle detection mechanism that detects the rotation angle of the moving member. FIG. 9 is a block diagram illustrating the electric configuration that detects the rotation angle of a nozzle pushing member by using the angle detection mechanism shown in FIG. 8. As shown in FIG. 8, the angle detection mechanism 90 is constituted by a magnet 91 and a magnetic sensor substrate 92 (corresponds to the magnetic sensor in accordance with the present invention).

The magnet 91 is fixed to the upper end of the moving member 85 (see FIGS. 2 to 5 and FIG. 8). The magnet 91 is a ring magnet having a ring-like shape centered on the rotation axis (vertical axis) of the moving member 85 and has an N pole and an S pole such that the rotation axis VA (vertical axis) of the moving member 85 is located therebetween in the XY plane perpendicular to the vertical axis (Z axis). The ring-like shape of the magnet 91 has a round hole 911 of a diameter larger than that of the guide member 84, and the guide member 84 is fitted into the hole of the moving member 85 through the hole 911 of the ring-shaped magnet 91.

The magnetic sensor substrate 92 is attached to the lower end of the arm 61b positioned above the moving member 85 (FIGS. 4, 5, and 8). The magnetic sensor substrate 92 has two Hall IC (Integrated Circuits) 921, 922 arranged with a 90° spacing around the rotation axis VA of the moving member 85. In other words, these two Hall IC 921, 922 have the same distance to the rotation axis VA, and the two lines connecting the Hall IC 921, 922 to the rotation axis VA are perpendicular to each other.

Thus, the magnet 91 provided at the upper end of the moving member 85 and the Hall IC 921, 922 of the magnetic sensor substrate 92 provided at the lower end of the arm 61b face each other in the vertical axis (Z axis) direction. Therefore, where the moving member 85 rotates, the relative mutual arrangement of the Hall IC 921, 922 and the magnet 91 in the rotation direction changes and the output signals Ss, Sc of the Hall IC 921, 922 change. Therefore, the angle detection mechanism 90 can detect the rotation angle θe of the magnet 91 (moving member 85) with respect to the magnetic sensor substrate 92 (arm 61b) on the basis of the output signals Ss, Sc of the Hall IC 921, 922.

Figure 10:
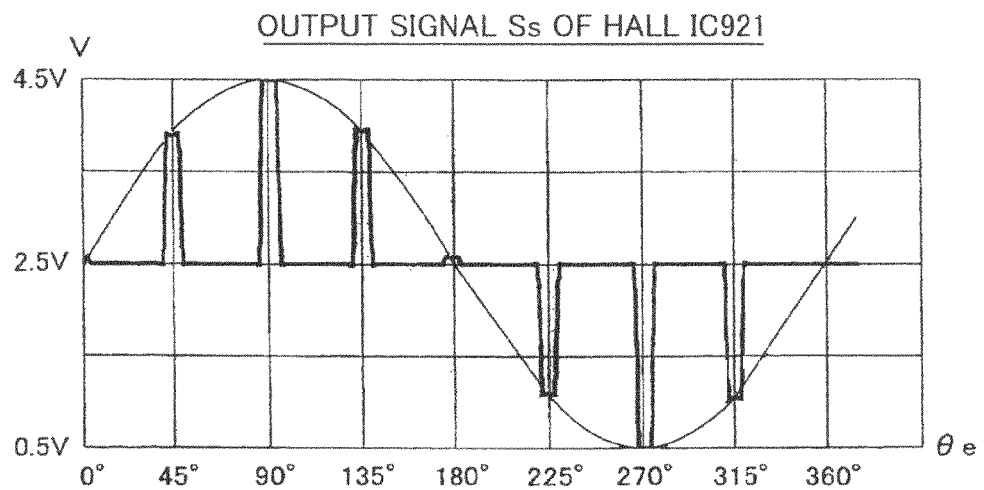
FIG. 10 is a graph illustrating signals used in detecting the rotation angle of the moving member.
Figure 10:
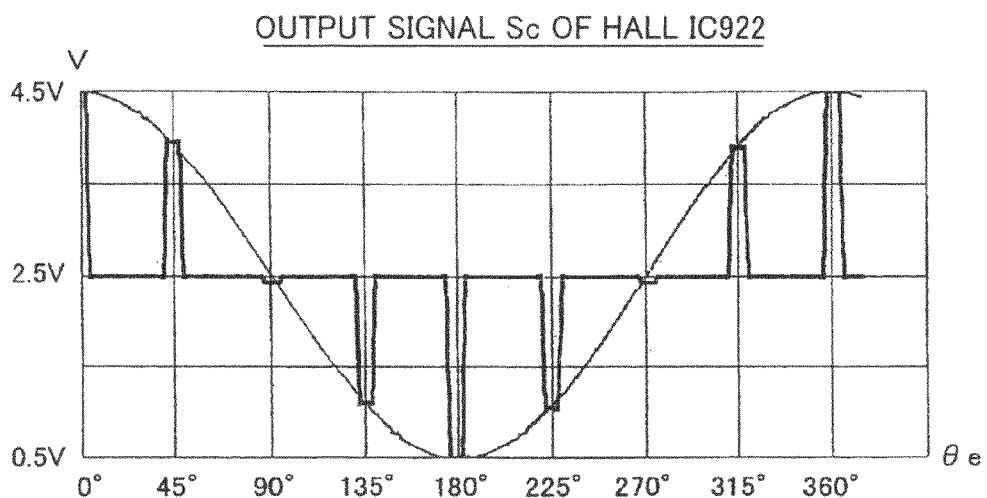
Figure 10:
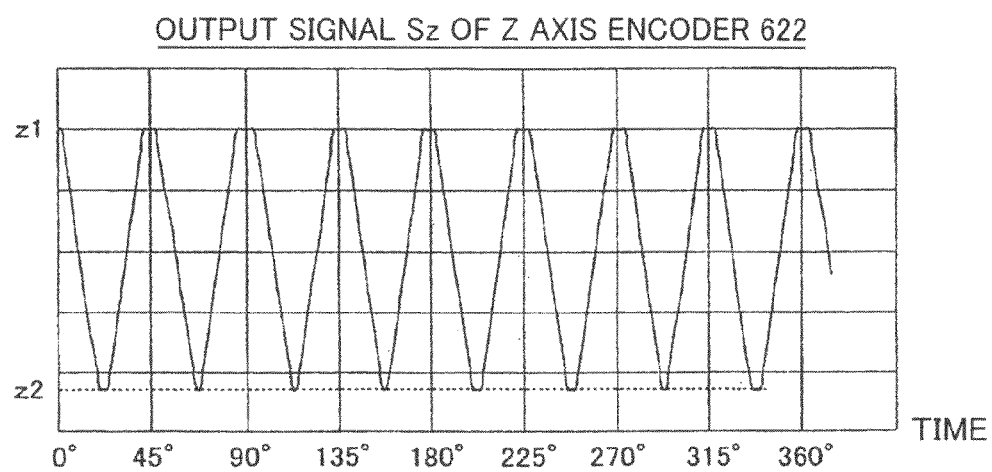

In this case, the detection of the rotation angle θe is controlled by a system controller SC and performed on the basis of the output signals Ss, Sc of the Hall IC 921, 922 and also output signals Sz, Sr of encoders 622e, 631e of the Z axis motor 622 and R axis motor 631 that drive the moving member 85. This detection operation will be explained below with reference to FIG. 10. FIG. 10 is a graph illustrating signals used in detecting the rotation angle of the moving member 85. In FIG. 10, the upper graph illustrates the relationships between the rotation angle θe and the output signal Ss of the Hall IC 921. The medium graph illustrates the relationship between the rotation angle θe and the output signal Sc of the Hall IC 922. The lower graph illustrates the output signal Sz of the Z axis encoder 622e indicating the height of the moving member 85.

As shown by the lower graph in FIG. 10, the moving member 85 moves in the vertical axis (Z axis) direction within a range between a read height z1 and an attraction height z2. The read height z1 and the attraction height z2 respectively correspond to the highest and lowest points of the range in which the moving member 85 moves in the vertical axis (Z axis) direction. In the present embodiment, when the moving member 85 is positioned at the read height z1, the rotation angle θe of the moving member 85 is detected, and when the moving member 85 is positioned at the attraction height z2, the part is attracted by the attraction nozzle 83 that has moved down together with the moving member 85. Further, as follows from the lower graph in FIG. 10, the moving member 85 rotates through 45° about the rotation axis VA for each cycle of reciprocating movement in which the moving member moves down from the read height z1 to the attraction height z2 and then again returns to the read height z1.

Meanwhile, as shown in the upper and medium graphs in FIG. 10, the values of output signals Ss, Sc of the Hall IC 921, 922 also change by following changes in the rotation angle θe of the moving member 85. The auxiliary curves in these graphs show the signals Ss, Sc outputted from the Hall IC 921, 922, respectively, when the moving member 85 performs only the rotation operation, without moving along the vertical axis (Z axis) direction. In this case, the output signal Ss of the Hall IC 921 is represented by a sine wave, and the output signal Sc of the Hall IC 922 is represented by a cosine wave. Since the rotation operation of the moving member 85 is actually accompanied by the movement in the vertical axis (Z axis) direction, the output signals Ss, Sc of the Hall IC 921, 922 have a pulse-like shape with peaks at positions in which the rotation angle θe is an integral multiple of 45°.

Further, the system controller SC controls the implementation timing of the rotation angle detection of the moving member 85 on the basis of the height of the magnetic member 85, while monitoring the signals Ss, Sc, Sz such as shown in FIG. 10. More specifically, the system controller SC outputs a command to read the signal Sz of the Z axis encoder 622e to a servo amplifier SA1 that controls the Z axis motor 622. This command is outputted all the times with a period of 500 μs or 1 ms. Each time the command is received, the servo amplifier SA1 reads the signal Sz of the Z axis encoder 622e and sends this signal to the system controller SC.

Where the system controller SC confirms on the basis of the transmitted signal Sz that the height of the moving member 85 has become the read height z1 and the moving member 85 has been positioned at a predetermined detection position Pd (FIG. 12), the system controller issues a command to read the output signals Ss, Sc of the Hall IC 921, 922 to the servo amplifier SA1. The servo amplifier SA1 that has received this command requests these signals Ss, Sc from the magnetic sensor substrate 92, and the magnetic sensor substrate 92 that has received the request performs the A/D (Analog/Digital) conversion of these signals Ss, Sc with an AD converter 93 and then outputs the converted signals to the servo amplifier SA1 by serial transmission.

The detection position Pd (FIG. 12) is fixed, and the read height z1 at which the output signals Ss, Sc of the Hall IC 921, 922 are read is constant. Therefore, the distance h (FIG. 12) between the (Hall IC 921, 922 of the) magnetic sensor substrate 92 and the magnet 91 in the vertical axis (Z axis) direction is also constant when the output signals Ss, Sc are read. Thus, the operation of reading the output signals Ss, Sc is performed at all times in a state in which the moving member 85 is positioned at the detection position Pd and the distance h to the (Hall IC 921, 922 of the) magnetic sensor substrate 92 is the predetermined detection distance.

The signals Ss, Sc that have been transmitted to the servo amplifier SA1 by means of the aforementioned reading operation are respectively a sine value and a cosine value of the rotation angle θe of the (magnet 91 attached to the) moving member 85 with respect to the magnetic sensor substrate 92. Therefore, the following equations are valid:

$$Ss = \sin\theta e \qquad \text{Eq. 1}$$

$$Ss = \cos\theta e \qquad \text{Eq. 2}$$

$$Ss/Sc = \sin\theta e / \cos\theta e = \tan\theta e \qquad \text{Eq. 3}$$

By modifying Eq. 3, it is possible to obtain the following equation:

$$\theta e = \arctan(Ss/Sc) \qquad \text{Eq. 4}$$

Here, arctan is an inverse tangent function. Accordingly, the servo amplifier SA1 determines the rotation angle θe of the moving member 85 with respect to the magnetic sensor substrate 92 by using Eq. 4 and outputs the rotation angle to the system controller SC by serial communication. These processing operations implemented by the servo amplifier SA1 are performed by a servo CPU (Central Processing Unit) incorporated in the servo amplifier SA1.

In parallel with the above processing, the system controller SC outputs at all times a command to read the signal θr of the R axis encoder 631e to a servo amplifier SA2 that controls the R axis motor 631. Each time this command is received, the servo amplifier SA2 reads the signal θr of the R axis encoder 631e and sends the signal to the system controller SC. This processing implemented by the servo amplifier SA1 is implemented by the servo CPU incorporated in the servo amplifier SA2.

Figure 11:
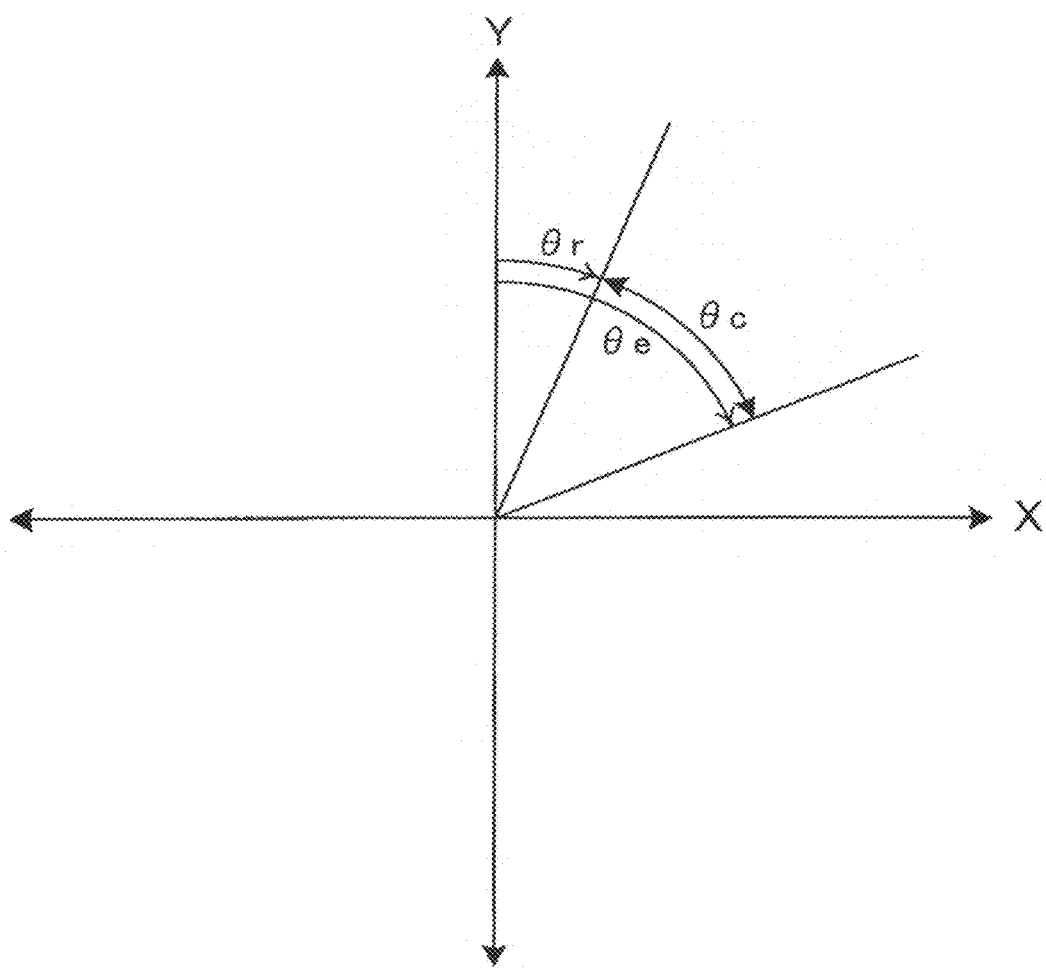
FIG. 11 is an explanatory drawing illustrating the calculations performed by a system controller to determine the rotation angle of the nozzle pushing member with respect to a plurality of attraction nozzles.

Then, the system controller SC calculates a rotation angle θc of the nozzle pushing member 86 with respect to a plurality of attraction nozzles 83 from the values of signal θe and signal θr at a point of time in which the height of the moving member 85 becomes the read height z1 (FIG. 11). Here, FIG. 11 is used to explain the calculations performed by the system controller in order to determine the rotation angle of the nozzle pushing member 86 with respect to the attraction nozzles 83. In the figure, the rotation angle is taken clockwise from the Y axis.

Thus, since the nozzle pushing member 86 is attached integrally to the moving member 85, the rotation angle of the moving member 85 is the rotation angle of the nozzle pushing member 86. However, the angle θe of the moving member 85 determined from the output signals Ss, Sc of the Hall IC 921, 922 is the angle with respect to the magnetic sensor substrate 92 (arm 61b) and not the angle with respect to a plurality of attraction nozzles 83. More specifically, since a plurality of attraction nozzles 83 receives the rotation drive from the R axis motor 631 and rotates through the rotation angle θr together with the shaft 81, it is necessary to perform correction by the rotation angle θr in order to determine the rotation angle θc of the nozzle pushing member 86 with respect to a plurality of attraction nozzles 83. Accordingly, the system controller SC performs calculations on the basis of the following equation to find the rotation angle θc of the nozzle pushing member 86 with respect to a plurality of attraction nozzles 83:

$$\theta c = \theta e - \theta r \qquad \text{Eq. 5}$$

The desired attachment nozzle 83 is accurately pushed down by the nozzle pushing member 86 on the basis of the rotation angle θc that has thus been detected.

In the present example, the aforementioned magnet 91, magnetic sensor substrate 92, servo amplifier SA1, and system controller SC function cooperatively as the rotation angle detection unit of the present invention, the servo amplifier SA1 and the system controller SC function cooperatively as the position detection unit of the present invention, and the system controller SC functions as the pushing member angle detection unit of the present invention.

Figure 12:
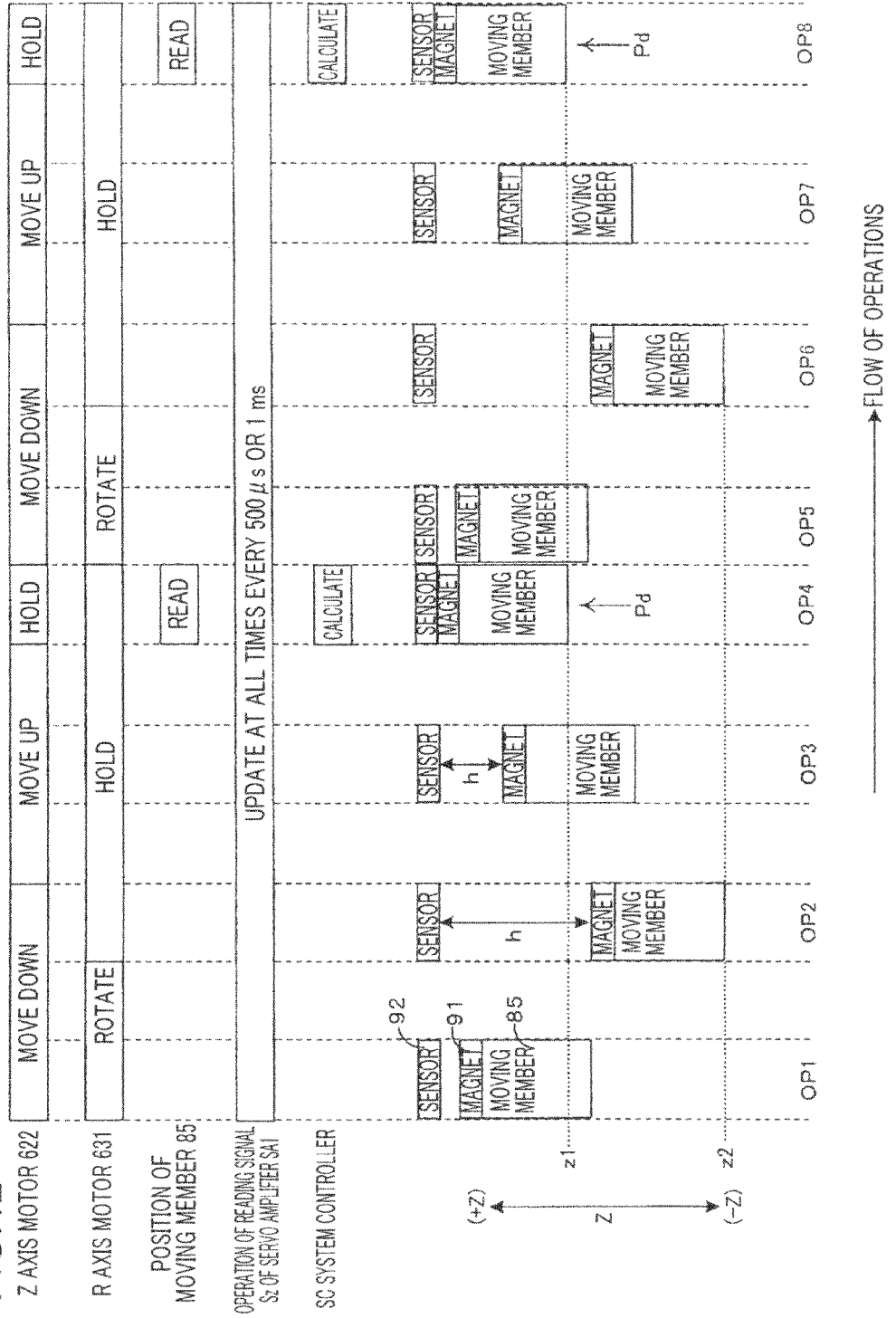
FIG. 12 illustrates an example of operations performed by the part mounting apparatus to detect the rotation angle of the nozzle pushing member.

Thus, in the present embodiment, the rotation angle θc of the nozzle pushing member 86 with respect to a plurality of attraction nozzles 83 is detected. A specific operation example of the entire part mounting apparatus 1 that implements the operation of the detecting the rotation angle θc will be explained below with reference to FIG. 12. FIG. 12 illustrates an example of operations performed by the part mounting apparatus to detect the rotation angle of the nozzle pushing member.

In the example shown in the figure, the moving member 85 repeatedly reciprocates between the read height z1 and the attraction height z2. More specifically, the Z axis motor 622 pushes the moving member 85 down to the attraction height z2 (operations OP1 to OP2), and the attraction nozzle 83 is pushed down by the nozzle pushing member 86 that moves down following the movement of the moving member 85. The operations of attracting and mounting the part are performed by the attraction nozzle 83.

Once operations of attracting and mounting the part are completed, the Z axis motor 622 raises the moving member 85 from the attraction height z2 to the read height z1 (operations OP2 to OP4). Within this period, the servo amplifier SA1 monitors the output signal Sz of the Z axis encoder 622e every 500 µs or 1 ms. At the point of time at which the moving member 85 has risen to the read height z1 and assumed the detection position Pd, the servo amplifier SA1 holds the moving member 85 at the detection position Pd, reads the outpour signals Ss, Sc of the Hall IC 921, 922, and determines the rotation angle θe from these output signals Ss, Sc (operation OP4).

Then, the system controller SC calculates the rotation angle θc of the nozzle pushing member 86 with respect to the attraction nozzles 83 on the basis of the rotation angle θe. However, in the example shown in FIG. 12, while the moving member 85 is being pushed down to the attraction height z2 (operations OP1 to OP2), the R axis motor 631 rotates the shaft 81 by the angle θr and a plurality of attraction nozzles 83 also rotate following this rotation. Accordingly, the system controller SC determines the rotation angle θc of the nozzle pushing member 86 with respect to the attraction nozzles 83 on the basis of the abovementioned Eq. 5. Operations OP5 to OP8 similar to the operations OP1 to OP4 are then implemented.

In the operation example shown in FIG. 12, the detection position Pd (FIG. 12) is also fixed and the read height z1 at which the output signals Ss, Sc of the Hall IC 921, 922 are read is also fixed. Therefore, the distance h between the (Hall IC 921, 922 of the) magnetic sensor substrate 92 and the magnet 91 in the vertical axis (Z axis) direction is also constant when the operation of reading the output signals Ss, Sc is implemented (in the example shown in FIG. 12, the reading operation is performed when the distance h is substantially zero, as shown in the operations OP4, OP8). Thus, the operation of reading the output signals Ss, Sc is performed at all times in a state in which the moving member 85 is positioned at the detection position Pd and the distance to the (Hall IC 921, 922 of the) magnetic sensor substrate 92 is the predetermined detection distance.

As described hereinabove, the processing of determining the rotation angle θc of the nozzle pushing member 86 with respect to a plurality of attraction nozzles 83 is mainly implemented by the system controller SC and the servo amplifier SA1. An example of processing flow performed by the system controller SC and the servo amplifier SA1 will be explained below.

Figure 13:
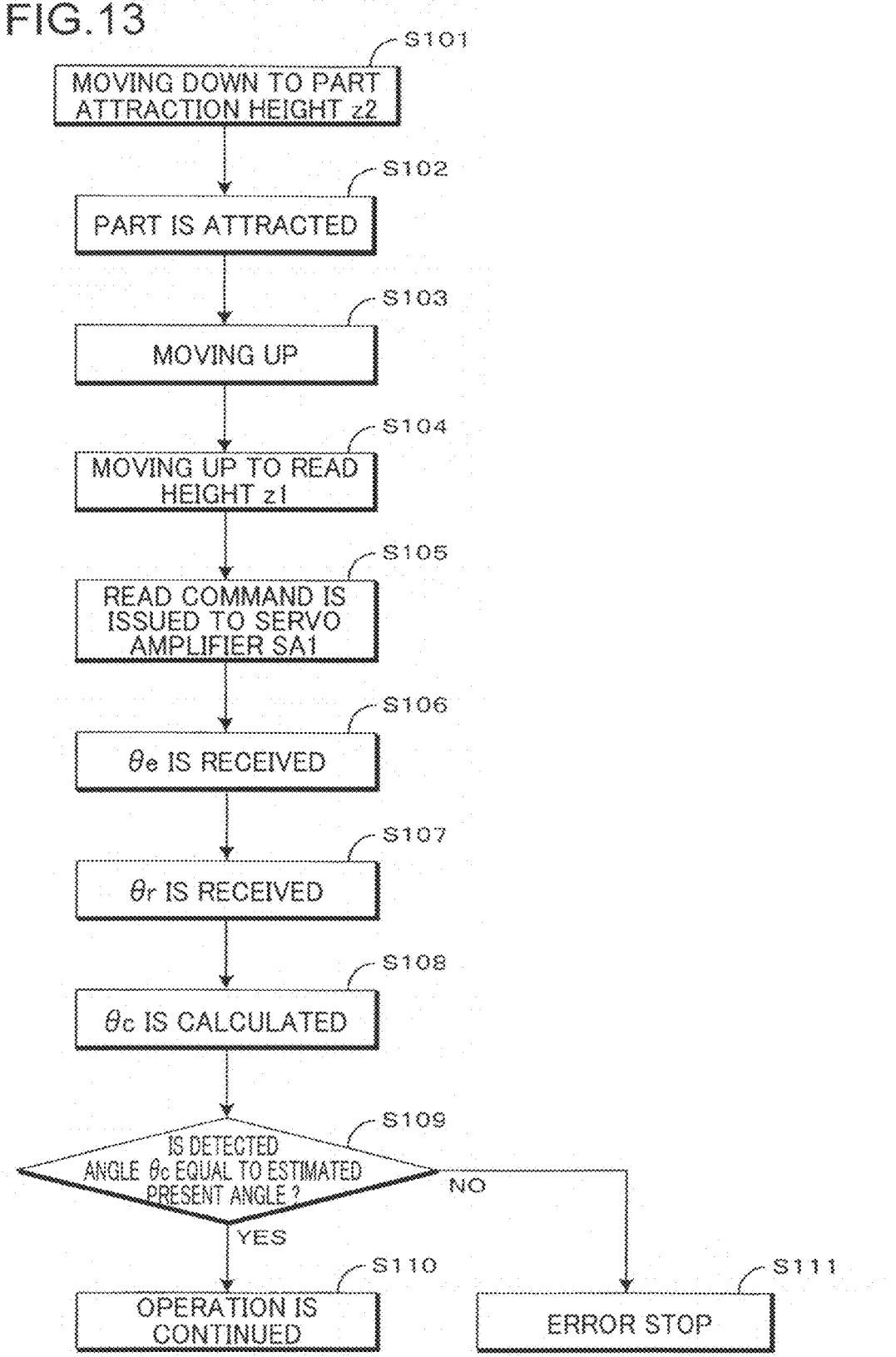
FIG. 13 is a flowchart illustrating an example of processing performed by the system controller.
Figure 14:
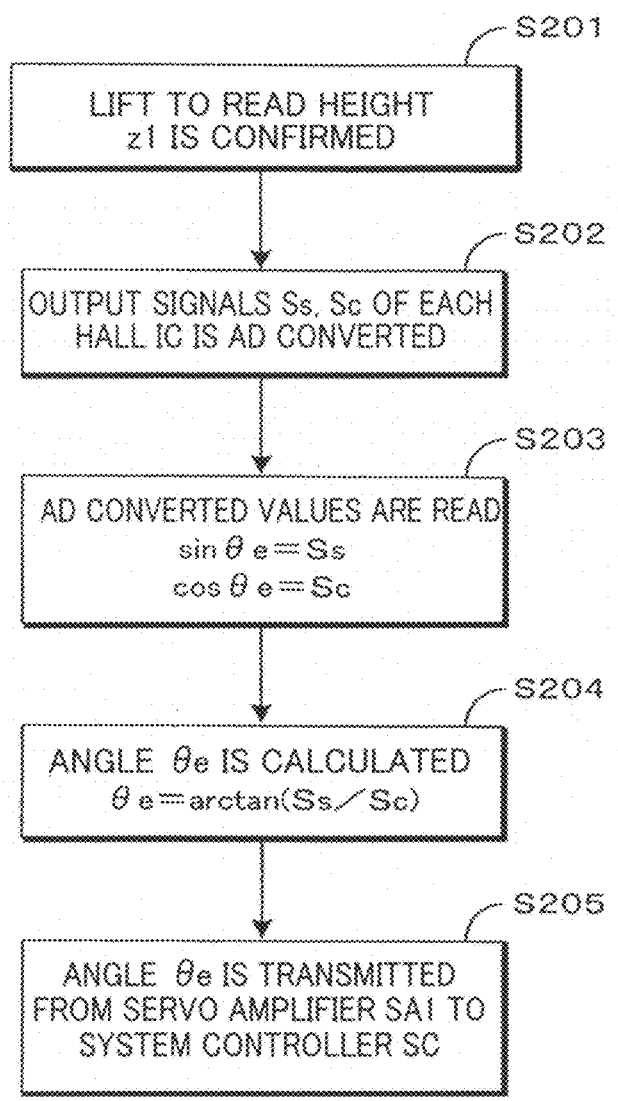
FIG. 14 is a flowchart illustrating an example of processing performed by a servo amplifier.

FIG. 13 is a flowchart illustrating an example of processing performed by the system controller. FIG. 14 is flowchart illustrating an example of processing performed by the servo amplifier. Where the system controller SC moves the moving member 85 downward to the part mounting height z2 in step S101, the operations of attracting and mounting the part with the attraction nozzle 83 are then performed in the subsequent step S102. Where this operation of mounting the part is completed, the system controller SC lifts the moving member 85 to the read height z1 (steps S103 and S104), and where it is detected that the moving member 85 has been lifted to the read height z1 and assumed the detection position Pd (position detection step), the system controller issues a read command to the servo amplifier SA2 (step S105).

Where the servo amplifier SA1 that has received the read command confirms, on the basis of the output signal Sz of the Z axis encoder 622e, that the moving member 85 has risen to the read height z1 (step S201), the servo amplifier performs the AD conversion of the output signals Ss, Sc of the Hall IC 921, 922 (step S202). Then, the servo amplifier SA1 determines the rotation angle θe of the moving member 85 with respect to the magnetic sensor substrate 92 on the basis of the abovementioned Eqs. 1 to 4 from the AD-converted signals Ss, Sc (steps S203, S204, rotation angle detection steps) and transmits the determined rotation angle to the system controller SC (step S205).

The system controller SC receives the rotation angle θe (step S106), receives the rotation angle θr of the attraction nozzles 83 from the R axis encoder 631e (step S107), and determines the rotation angle θc of the nozzle pushing member 86 with respect to the attraction nozzles 83 from these angles θe, θr (step S108).

Then, in step S109, the system controller SC determines whether or not the rotation angle θc that has thus been detected is equal to an estimated present angle. The estimated present angle is the present rotation angle of the moving member 85 with respect to the attraction nozzles 83 that is estimated from the number of reciprocating operations performed by the moving member 85. When the actually detected rotation angle θc matches the estimated present angle (the case of "YES" in step S109), the system controller SC continues the part mounting operation performed by the part mounting apparatus 1 (step S110).

Meanwhile, when the actually detected rotation angle θc does not match the estimated present angle (the case of "NO" in step S109), the system controller SC interrupts the part mounting operation performed by the part mounting apparatus 1 (step S111). In other words, in this case it is assumed that a malfunction of the moving member 85 has occurred, that is, the moving member 85 does not rotate although the reciprocating operation is performed, or the moving member 85 rotates although the reciprocating operation is not performed. When such malfunction occurs, the rotation angle θc of the nozzle pushing member 86 attached to the moving member 85 shifts from the desired rotation angle and the attraction nozzle 83 is erroneously pushed down. Accordingly, when the detected rotation angle θe differs from the estimated present angle, the system controller SC stops the part mounting operation performed by the part mounting apparatus 1 and outputs an error signal.

This error signal may be a sound signal produced by a buzzer or the like, or may be a signal displayed on the display or the like that functions as an interface with the operator. As a result, the operator recognizes the malfunction of the moving member 85 and expediently starts the operation of repairing the part mounting apparatus 1.

As described hereinabove, in the present embodiment, the moving member 85 is configured to be capable of rotating with respect to the arm 61b about the rotation axis VA as a center. The rotation angle of the moving member 85 is determined by using the magnet 91 and the Hall IC 921, 922. More specifically, the magnet 91 is attached to either of the arm 61b and the moving member 85, the Hall IC 921, 922 are attached to the other one, and the Hall IC 921, 922 are disposed opposite the magnet 91. Therefore, where the moving member 85 rotates, the relative mutual arrangement of the Hall IC 921, 922 and the magnet 91 in the rotation direction changes and the output signals of the Hall IC 921, 922 also changes. Therefore, the rotation angle θe of the moving member 85 with respect to the arm 61b can be detected on the basis of the outputs of the Hall IC 921, 922.

In addition to the operation of rotating about the rotation axis VA as a center, the moving member 85 also can move in the rotation axis VA direction. With such configuration, the detection accuracy of the rotation angle θe of the moving member 85 sometimes decreases due to the variation in the distance between the magnet 91 and the Hall IC 921, 922 in the rotation axis VA direction. To resolve this problem, in the present embodiment, the rotation angle θe of the moving member 85 with respect to the arm 61b is detected on the basis of the output signals Ss, Sc of the Hall IC 921, 922 in a state in which the moving member 85 is in the detection position Pd in which the distance h between the magnet 91 and the Hall IC 921, 922 in the rotation axis VA direction becomes the predetermined detection distance. Therefore, the effect of variations in the distance between the magnet 91 and the Hall IC 921, 922 is eliminated and the rotation angle θe of the moving member 85 with respect to the arm 61b can be detected with high accuracy from the output signals Ss, Sc of the Hall IC 921, 922.

The moving member 85 can rotate about the rotation axis VA as a center and also can move in the rotation axis VA direction. In this case, separate mechanisms for driving the moving member 85 can be provided for the rotation about the rotation axis VA and the movement in the rotation axis VA direction. However, from the standpoint of enabling the use of a drive mechanism of a simpler configuration, in the present embodiment, the moving member 85 is configured such that can rotate about the arm 61b when moved reciprocatingly in the rotation axis VA direction. As a result, not only the movement in the rotation axis VA direction, but also the rotation about the rotation axis VA as a center can be realized by moving the moving member 85 in the rotation axis VA direction. As a result, the mechanism for driving the moving member 85 can be simplified.

As mentioned hereinabove, the detection of signal outputs of the Hall IC 921, 922 is implemented when the distance h between the magnet 91 and the Hall IC 921, 922 in the rotation axis VA direction is the predetermined detection distance. More specifically, in the present embodiment, the detection distance is set to a distance between the magnet 91 and the Hall IC 921, 922 attained when the moving member 85 is at the read height z1, which is the closest to the magnetic sensor substrate 92, within the movement range between the heights z1 and z2. In other words, the detection distance is set to the minimum value of the distance between the magnet 91 and the Hall IC 921, 922 in the rotation axis VA direction, which changes following the movement of the moving member 85 in the movement range z1 to z2. As a result, the rotation angle θe of the magnet 91 can be accurately determined on the basis of a comparatively large signal outputted from the Hall IC 921, 922 which are close to the magnet 91. Thus, since the output signals of the Hall IC 921, 922 at the time of detection of the rotation angle θe of the moving member 85 can be increased, noise resistance of the output signals of the Hall IC 921, 922 is increased. As a result, the rotation angle θe of the moving member 85 with respect to the arm 61b can be detected with higher accuracy.

The system controller SC of the abovementioned embodiment determines that the distance h between the magnet 91 and the Hall IC 921, 922 in the rotation axis VA direction is the predetermined detection distance on the basis of the output signal Sz of the Z axis encoder 622e of the Z axis motor 622. Such a configuration makes it possible to determine accurately that the distance h between the magnet 91 and the Hall IC 921, 922 in the rotation axis VA direction is the predetermined detection distance from the encoder 622e of the Z axis motor 622 and is useful for detecting the rotation angle θe of the moving member 85 with high accuracy.

Further, a variety of magnetic sensors can be used for detecting the magnetism of the magnet 91, but in the present embodiment, the magnetic sensor has two Hall IC 921, 922 arranged with a 90° spacing around the rotation axis VA. With such configuration, the rotation angle θe of the moving member 85 can be determined from the outputs of the two Hall IC 921, 922 by a comparatively simple processing of plugging the ratio of the output values Ss, Sc of the two Hall IC 921, 922 into the inverse tangent function.

Further, in the part mounting apparatus of the present embodiment, the rotation angle θe of the moving member 85 is determined on the basis of the output signals Ss, Sc of the Hall IC 921, 922 when the distance between the magnet 91 and the Hall IC 921, 922 in the rotation axis VA direction is the predetermined detection distance. Therefore, the effect of the distance h between the magnet 91 and the Hall IC 921, 922 is eliminated and the rotation angle θe of the moving member 85 with respect to the arm 61b can be detected with high accuracy. Further, since the nozzle pushing member 86 is integrally attached to the moving member 85, the rotation angle of the nozzle pushing member 86 with respect to a plurality of attraction nozzles 83 supported by the shaft 81 can be accurately determined from the detected rotation angle θe of the moving member 85 with respect to the arm 61b, and the desired attraction nozzle 83 can be accurately pushed down by the nozzle pushing member 86.

Further, in the present embodiment, the shaft 81 is configured to be rotatable about the vertical axis VA with respect to the arm 61b, and the system controller SC determines the rotation angle θc of the nozzle pushing member 86 with respect to a plurality of attraction nozzles 83 supported by the shaft 81 by subtracting the rotation angle θr of the shaft 81 with respect to the arm 61b from the detected rotation angle of the moving member 85 with respect to the arm 61b. As a result, despite the configuration in which the shaft 81 can rotate about the arm 61b and the moving member 85 and the nozzle pushing member 86 rotate following the rotation of the shaft 81, it is possible to determine accurately the rotation angle θc of the nozzle pushing member 86 with respect to the shaft 81.

Further, in the abovementioned embodiment, the magnet is attached to the rotatably moving member 85, whereas the magnetic sensor substrate 92 is attached to the fixedly disposed arm 61b. Since the magnetic sensor substrate 92 is thus attached to the fixed member (arm 61b), it is possible to prevent the occurrence of failures such as the disconnection of the wiring of the magnetic sensor substrate 92 caused by the movement of the magnetic sensor substrate 92.

The correspondence relationship between the above-described embodiment and the present invention will be explained below. Thus, in the present embodiment, the "rotation angle detection device" of the present invention is constituted by the moving member 85, arm 61b, magnet 91, magnetic sensor substrate 92, servo amplifiers SA1, SA2, and system controller SC. More specifically, the moving member 85 corresponds to the "rotating body" of the present invention, the arm 61b corresponds to the "support body" of the present invention, the magnet 91 corresponds to the "magnet" of the present invention, and the magnetic sensor substrate 92 corresponds to the "magnetic sensor" of the present invention. Further, the magnet 91, magnetic sensor substrate 92, servo amplifier SA1, and system controller SC function cooperatively as the "rotation angle detection unit" of the present invention, and the servo amplifier SA1 and the system controller SC function cooperatively as the "position detection unit" of the present invention. Further, the range of heights z1 to z2 corresponds to the "predetermined range" in which the rotating body (moving member 85) moves in accordance with the present invention. The part mounting apparatus 2 corresponds to the "part mounting apparatus" of the present invention, the attraction nozzle 83 corresponds to the "attraction nozzle" of the present invention, the shaft 81 corresponds to the "shaft" of the present invention, the nozzle pushing member 86 corresponds to the "nozzle pushing member" of the present invention, and the system controller SC corresponds to the "pushing member angle detection unit" of the present invention.

The present invention is not limited to the above-described embodiment and a variety of changes can be made in addition to those described hereinabove, without departing from the essence of the present invention. For example, in the above-described embodiment, it is determined that the moving member 85 is positioned at the detection position Pd on the basis of the output signal Sz of the Z axis encoder 622e. However, it is also possible to determine that the moving member 85 is positioned at the detection position Pd with an optical sensor or the like provided close to the detection position Pd. Alternatively it is also possible to determine that the moving member 85 is positioned at the detection position Pd with a contact-type sensor that is contact with the moving member 85 positioned at the detection position Pd.

Further, in the above-described embodiment, the magnet 91 is provided at the upper end of the moving member 85, and the Hall IC 921, 922 of the magnetic sensor substrate 92 face the magnet 91 from above the moving member 85. However, this position of the magnet 91 with respect to the magnetic sensor substrate 92 is not limiting. For example, a configuration may be used in which the magnet 91 is provided at the lower end of the moving member 85, and the Hall IC 921, 922 of the magnetic sensor substrate 92 face the magnet 91 from below the moving member 85. The type of the magnetic sensor is also not limited to the Hall IC, and magnetic sensors other than the Hall IC can be used.

Further, in the above-described embodiment, the magnetic sensor substrate 92 is attached to the arm 61b, whereas the magnet 91 is attached to the moving member 85. However, a configuration can be also used in which the magnet 91 is attached to the arm 61b, whereas the magnetic sensor substrate 92 is attached to the moving member 85.

Further, in the above-described embodiment, the detection distance is set to a minimum value of the distance between the magnet 91 and the Hall IC 921, 922 in the rotation axis VA direction, which changes following the movement of the moving member 85 within the movement range z1 to z2, and the detection position Pd is determined corresponding to such setting. However, this set value of the detection distance is not limiting, and the detection position Pd can be also changed as appropriate.

Further, in the configuration of the above-described embodiment, the nozzle pushing member 86 moves from one above-nozzle position to another above-nozzle position adjacent thereto when the moving member 85 performs one reciprocating movement in the vertical axis direction (Z direction). However, a configuration may be also used in which the nozzle pushing member 86 moves from one above-nozzle position to another above-nozzle position adjacent thereto corresponding to two or more reciprocating movements of the moving member 85.

Further, in the above-described embodiment, two moving elements 851 are provided at the moving member 85, but this number of the moving elements 851 provided at the moving member 85 is not limiting.

Further, in the configuration of the above-described embodiment, the moving member 85 is rotated following the up-down movement of the moving member 85 by guiding the moving element 851 along the grooves Ca, Cb provided in the guide member 84, but a configuration with a reversed relationship of components can be also used. For example, a configuration may be used in which "projections" of a protruding shape are provided in the guide member 84 instead of the grooves Ca, Cb, and a "guide" or "roller" constituted by a receding groove that is engaged with the aforementioned "projection" is provided instead of the moving element 851 at the moving member 85.

Further, in the configuration of the above-described embodiment, the moving element 851 moves in the guide groove Ca from below upward in the vertical axis direction (Z direction), then moves obliquely upward from the intermediate section of the guide groove Ca along the connecting groove Cb, and moves to the upper side of the guide groove Ca adjacent to the guide groove Ca. However, a configuration may be also used in which the moving element 851 moves in the guide groove Ca from above downward in the vertical axis direction (Z direction), then moves obliquely downward from the intermediate section of the guide groove Ca along the connecting groove Cb, and moves to the lower side of the guide groove Ca adjacent to the guide groove Ca.

Further, in the above-described embodiment, the guide groove Ca is formed linearly in the vertical axis direction (Z direction). However, the above-described shape of the guide groove Ca is not limiting and guide grooves of a variety of shapes such as curved or zigzag shapes can be used as appropriate. The shape of the connecting groove Cb is also not limited to that described hereinabove and can be changed as appropriate.

Further, in the above-described embodiment, the above-nozzle position is provided directly above the corresponding attraction nozzle 83 in the vertical axis direction (Z direction), and the nozzle pushing member 86 pushes the attraction nozzle 83 downward by moving down from the above-nozzle position to the attraction nozzle 83 along the vertical axis direction (Z direction). However, a configuration may be also used in which the above-nozzle position is provided obliquely above the corresponding attraction nozzle 83 in the vertical axis direction (Z direction), and the nozzle pushing member 86 pushes the attraction nozzle 83 down by moving obliquely down from the above-nozzle position to the attraction nozzle 83 with respect to the vertical axis direction (Z direction).

Figure 15:
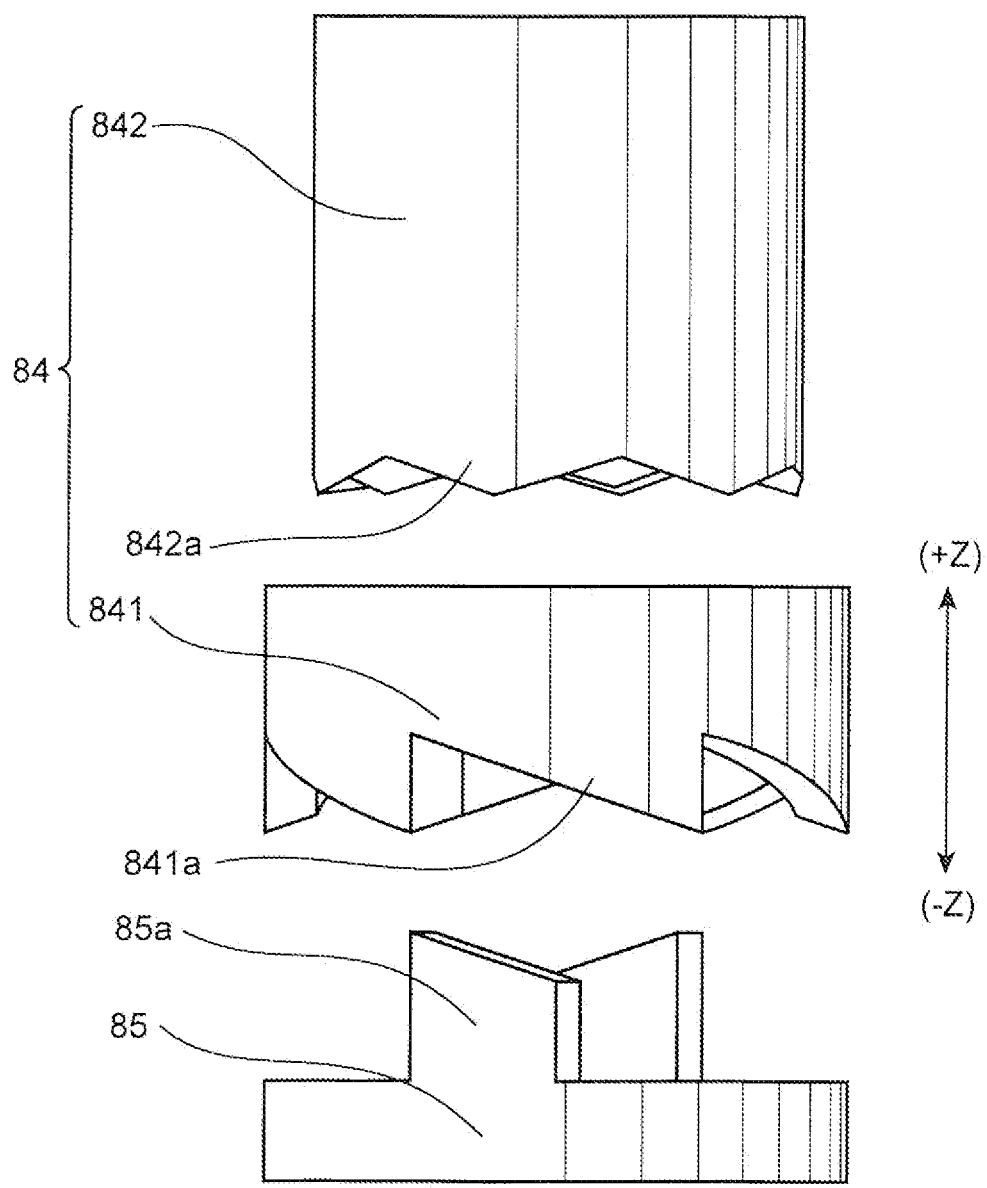
FIG. 15 is an exploded drawing illustrating a variation example of the guide member and moving member.

The configurations of the guide member 84 and the moving member 85 can be also changed in a variety of ways. For example, the configuration such as shown in FIG. 15 can be used. FIG. 15 is an exploded drawing illustrating a variation example of the guide member and moving member. In this variation example, the guide member 84 is constituted by a first guide part 841 and a second guide part 842. The first guide part 841 has a hollow substantially cylindrical shape with a central axis thereof being parallel to the vertical axis direction (Z direction), and a plurality of first guide teeth 841a of a sawtooth shape that face downward in the vertical axis direction (−Z direction) are provided in a row with equal pitch on the circumference of the bottom surface of the first guide part. The second guide part 842 has a hollow substantially cylindrical shape with a central axis thereof being parallel to the vertical axis direction (Z direction), and a plurality of peak-like second guide teeth 842a that face downward in the vertical axis direction (−Z direction) are provided in a row with equal pitch on the circumference of the bottom surface of the second guide part. The moving member 85 has a substantially cylindrical shape with a central axis thereof being parallel to the vertical axis direction (Z direction), and two moving elements 85*a* facing upward in the vertical axis direction (+Z direction) are arranged on the circumference of the upper surface of the moving member. These two moving members 85*a* are disposed at positions displaced with respect to each other by 180° about the central axis of the moving member 85 as a center.

The first guide teeth 841*a* of the first guide part 841 are brought close to the moving element 85*a* of the moving member 85 located therebelow in the vertical axis direction (−Z direction). The second guide part 842 is fitted from the vertical axis direction (Z direction) into the hollow portion of the first guide part 841 and the second guide teeth 842*a* of the second guide part are brought close to the moving element 85*a* of the moving member 85 located therebelow in the vertical axis direction (−Z direction). By moving in the vertical axis direction (Z direction), the moving element 85*a* of the moving member 85 can be abutted upon the first guide teeth 841*a* and the second guide teeth 842*a*.

Figure 16:
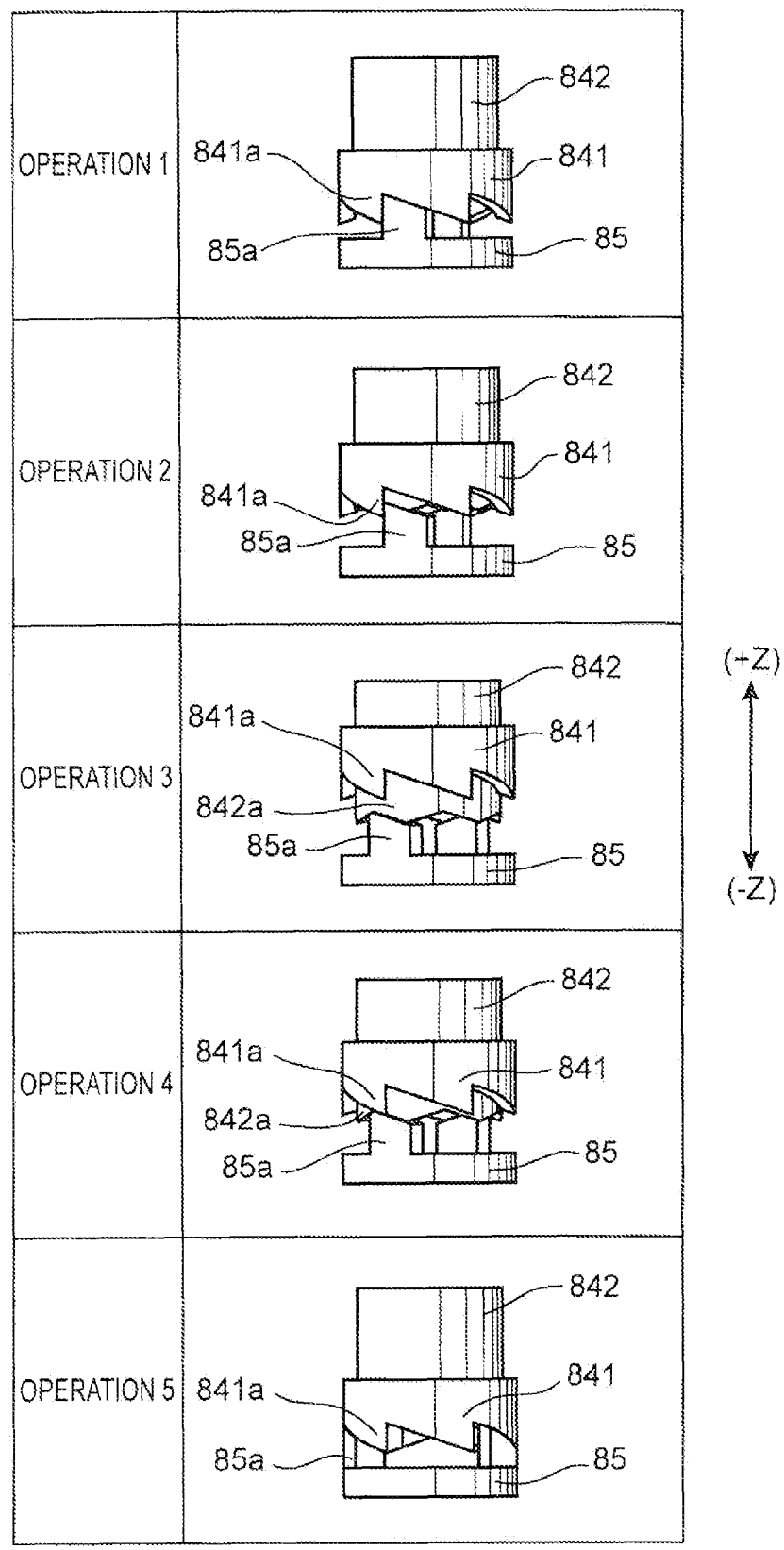
FIG. 16 is an operation explanatory diagram illustrating a variation example of the guide member and moving member.

The guide member 84 (first and second moving members 841, 842) are fixed and do not rotate about the vertical axis (Z axis), whereas the moving member 85 is provided to be rotatable about the vertical axis (Z axis). Where the moving member 85 moves reciprocatingly in the vertical axis direction (Z direction), the moving element 85*a* moves from one first guide teeth 841*a* to the other first guide teeth 841*a* adjacent thereto, and the moving member 85 follows this movement and rotates about the vertical axis (Z axis) by one pitch of the first guide teeth 841*a*. This configuration will be described with reference to FIG. 16. FIG. 16 is an operation explanatory diagram illustrating a variation example of the guide member and moving member. In the explanation below, the attention is focused on the moving member 85*a* assigned with the reference symbol 85*a* in FIG. 16.

Before the series of operations 2 to 4 performed to rotate the moving member 85 is started, the moving element 85*a* is in the lifted state and completely meshed to the very depth with the first guide teeth 841*a* (operation 1). The moving element 85*a* is partially abutted on the second guide teeth 842*a* (not completely meshed). From this state, the moving member 85 moves down (operation 2), and the moving element 85*a* is completely withdrawn downward from the first guide teeth 841*a* (operation 3). Further, the second guide part 842 also moves down following the downward movement of the moving member 85, and the moving element 85*a* is completely meshed with the second guide teeth 842*a* of the second guide part 842 (operation 3). As a result, the moving element 85*a* rotates about the vertical axis (Z axis) and slightly shifts leftward, as shown in the figure, with respect to the first guide part 841. Where the moving member 85 and the second guide part 841 then rise from this state, the moving element 85*a* abuts on the first guide teeth 841*a* (operation 4) and rotates about the vertical axis (Z axis), while being guided by the first guide teeth 841 (operation 5). The moving member 85 which moves reciprocatingly in the vertical axis direction (Z direction) can thus be rotated about the vertical axis (Z axis) by one pitch of the first guide teeth 84*a*.

Further, in the above-described embodiment, the mounting heads 8 are arranged linearly in the horizontal direction (X direction). However, this arrangement mode of the mounting heads 8 is not limiting, and the mounting heads may be arranged in a zigzag manner in the horizontal direction (X direction).

Further, the number of the mounting heads 8 provided in the head unit 6 and the number of attraction nozzles 83 provided in the mounting head 8 can be variously changed as appropriate in other configurations.

The above-described invention can be summarized as follows.

A rotation angle detection device according to a first aspect of the present invention includes: a support body; a rotating body that has a rotation axis and can rotate with respect to the support body and move in a rotation axis direction that is an extension direction of the rotation axis; a rotation angle detection unit that has a magnet attached to either of the support body and the rotating body, and a magnetic sensor attached to the other of the support body and the rotating body and facing the magnet in the rotation axis direction, and that detects a rotation angle of the rotating body with respect to the support body on the basis of an output signal of the magnetic sensor; and a position detection unit that detects that the rotating body is positioned at a detection position in which a distance between the magnet and the magnetic sensor in the rotation axis direction becomes a predetermined detection distance, wherein the rotation angle detection unit reads the output signal of the magnetic sensor and determines the rotation angle of the rotating body with respect to the support body from the output signal when the position detection unit detects that the rotating body is positioned at the detection position.

A rotation angle detection method according to another aspect of the present invention is a method for detecting a rotation angle, with respect to a support body, of a rotating body that can rotate about a rotation axis with respect to the support body and move in a rotation axis direction that is an extension direction of the rotation axis, by using a magnet attached to either of the support body and the rotating body and a magnetic sensor attached to the other of the support body and the rotating body and facing the magnet in the rotation axis direction, the rotation angle detection method including:

a position detection step of detecting that the rotating body is positioned at a detection position in which a distance between the magnet and the magnetic sensor in the rotation axis direction becomes a predetermined detection distance; and a rotation angle detection step of reading an output signal of the magnetic sensor and determining the rotation angle of the rotating body with respect to the support body from the output signal when the rotating body is detected to be positioned at the detection position in the position detection step.

In the invention (rotation angle detection apparatus, rotation angle detection method) with such features, the rotating body is configured to be rotatably about the rotation axis with respect to the support body. The rotation angle of the rotating body is determined by using a magnet and a magnetic sensor. More specifically, the magnet is attached to either of the support body and the rotating body, and the magnetic sensor is attached to the other of the two, and the magnetic sensor is disposed to face the magnet. Therefore, where the rotating body rotates, the relative mutual arrangement of the magnetic sensor and the magnet in the rotation direction changes, and the output signal of the magnetic sensor also changes. As a result, the rotating body angle detection unit can detect the rotation angle of the rotating body with respect to the support body on the basis of the magnetic sensor output.

However, in addition to rotation about the rotation axis, the rotating body can also move in the rotation axis direction. With such configuration, the detection accuracy of the rotation angle of the rotating body can decrease due to the variation in the distance between the magnet and the magnetic sensor in the rotation axis direction. To resolve this problem, in accordance with the present invention, the rotation angle of the rotating body with respect to the support body is detected on the basis of the output signal of the magnetic sensor in a state in which the rotating body is at the detection position in which the distance between the magnet and the magnetic sensor in the rotation axis direction is the predetermined detection distance. Therefore, the effect of variations in the distance between the magnetic sensor and the magnet can be eliminated and the rotation angle of the rotating body with respect to the support body can be detected with high accuracy from the output signal of the magnetic sensor.

In the above-described rotation angle detection device, the rotating body preferably rotates with respect to the support body by moving reciprocatingly in the rotation axis direction.

Thus, the rotating body can implement both the operation of rotating about the rotation axis and the operation of moving in the rotation axis direction. In this case, a mechanism for rotating about the rotation axis and a mechanism for moving in the rotation axis direction can be separately provided as mechanisms for driving the rotating body. However, with the configuration described hereinabove, not only the operation of moving in the rotation axis direction, but also the operation of rotating about the rotation axis can be implemented by moving the rotating body in the rotation axis direction. As a result, the mechanism for driving the rotating body can be simplified.

The rotating body may move within a predetermined range in the rotation axis direction, and the detection distance may be a minimum value of a distance between the magnet and the magnetic sensor in the rotation axis direction, the distance changing following the movement of the rotating body along the rotation axis direction within the predetermined range.

With such a configuration, the rotation angle of the magnet can be accurately determined on the basis of a comparatively large signal outputted from the magnetic sensor located close to the magnet. Thus, the output signal of the magnetic sensor obtained when the rotation angle of the rotating body is detected can be increased. Therefore, noise resistance of the output signal of the magnetic sensor is increased. As a result, the rotation angle of the rotating body with respect to the support body can be detected with high accuracy.

Further, the rotating body may be driven in the rotation axis direction by a motor equipped with an encoder, and the position detection unit may detect that the rotating body is positioned at the detection position on the basis of the output signal of the encoder.

With such a configuration, the encoder of the motor makes it possible to determine accurately that the rotating body is in the detection position and that the distance between the magnet and the magnetic sensor in the rotation axis direction is the detection distance. Therefore, such configuration is useful for detecting the rotation angle of the rotating body with high accuracy.

Further, it is preferred that the magnetic sensor have two Hall elements arranged with a spacing of 90° around the rotation axis.

A variety of magnetic sensors can be used, but with the above-described magnetic sensor, the rotation angle of the rotating body can be determined from the output of the magnetic sensor by a comparatively simple processing. For example, the rotating body angle detection unit can be configured such that the rotation angle of the rotating body with respect to the support body is determined by plugging a ratio of output values of the two Hall elements into an inverse tangent function.

The part mounting apparatus according to still another aspect of the present invention is a part mounting apparatus for mounting a part on a substrate, including: the rotation angle detection device according to the first aspect, in which the rotation axis is a vertical axis; a plurality of attraction nozzles arranged around the vertical axis below the rotating body; a shaft that extends in a direction parallel to the vertical axis, supports the plurality of attraction nozzles so that the attraction nozzles can moved up and down, and supports the rotating body rotatably about the vertical axis; a nozzle pushing member that is attached to the rotating body, and that can be disposed at any above-nozzle position, from among above-nozzle positions which are respective positions above the plurality of attraction nozzles and can move down from the above-nozzle position to push the attraction nozzle down by rotating integrally with the rotating body; and a pushing member angle detection unit that determines a rotation angle of the nozzle pushing member with respect to the plurality of attraction nozzles, wherein the pushing member angle detection unit determines the rotation angle of the nozzle pushing member with respect to the plurality of attraction nozzles on the basis of the rotation angle of the rotating body with respect to the support body that has been detected by the rotation angle detection device.

In the invention (part mounting apparatus) with such features, the rotating body angle detection unit detects the rotation angle of the rotating body on the basis of the output signal of the magnetic sensor when the distance between the magnet and the magnetic sensor in the rotation axis direction is the predetermined detection distance. Therefore, the effect of variations in the distance between the magnetic sensor and the magnet can be eliminated and the rotation angle of the rotating body with respect to the support body can be detected with high accuracy. Further, since the nozzle pushing member is integrally attached to the rotating body, the rotation angle of the nozzle pushing member with respect to a plurality of attraction nozzles supported by the shaft can be accurately determined from the detected rotation angle of the rotating body with respect to the support body, and the desired attraction nozzle can be accurately pushed by the nozzle pushing member.

In such part mounting apparatus, the shaft can rotate about the vertical axis with respect to the support body, and the pushing member angle detection unit may determine the rotation angle of the nozzle pushing member with respect to the plurality of attraction nozzles supported by the shaft by subtracting the rotation angle of the shaft with respect to the support body from the rotation angle of the rotating body with respect to the support body that has been detected by the rotation angle detection device.

Because of such features, the rotation angle of the nozzle pushing member with respect to the shaft can be accurately determined despite the configuration in which the shaft can rotate about the support body and the rotating body and the nozzle pushing member rotate following the rotation of the shaft.

This application is based on Japanese Patent application No. 2011-087355 filed in Japan Patent Office on Apr. 11, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A rotation angle detection device comprising:
a support body;

a rotating body that has a rotation axis and can rotate with respect to the support body and move in a rotation axis direction that is an extension direction of the rotation axis;

a rotation angle detection unit that has a magnet attached to either of the support body and the rotating body, and a magnetic sensor attached to the other of the support body and the rotating body and facing the magnet in the rotation axis direction, and that detects a rotation angle of the rotating body with respect to the support body on the basis of an output signal of the magnetic sensor; and a position detection unit that detects that the rotating body is positioned at a detection position in which a distance between the magnet and the magnetic sensor in the rotation axis direction becomes a predetermined detection distance, wherein the rotation angle detection unit reads the output signal of the magnetic sensor and determines the rotation angle of the rotating body with respect to the support body from the output signal when the position detection unit detects that the rotating body is positioned at the detection position.

2. The rotation angle detection device according to claim 1, wherein the rotating body rotates with respect to the support body by moving reciprocatingly in the rotation axis direction.

3. The rotation angle detection device according to claim 1, wherein
the rotating body moves within a predetermined range in the rotation axis direction, and
the detection distance is a minimum value of a distance between the magnet and the magnetic sensor in the rotation axis direction, the distance changing following the movement of the rotating body along the rotation axis direction within the predetermined range.

4. The rotation angle detection device according to claim 1, wherein
the rotating body is driven in the rotation axis direction by a motor equipped with an encoder, and
the position detection unit detects that the rotating body is positioned at the detection position on the basis of an output signal of the encoder.

5. The rotation angle detection device according to claim 1, wherein the magnetic sensor has two Hall elements arranged with a spacing of 90° around the rotation axis.

6. The rotation angle detection device according to claim 5, wherein the rotation angle detection unit determines the rotation angle of the rotating body with respect to the support body by plugging a ratio of output values of the two Hall elements into an inverse tangent function.

* * * * *